United States Patent [19]
Mays

[11] Patent Number: 6,035,321
[45] Date of Patent: *Mar. 7, 2000

[54] METHOD FOR ENFORCING A HIERARCHICAL INVOCATION STRUCTURE IN REAL TIME ASYNCHRONOUS SOFTWARE APPLICATIONS

[75] Inventor: Richard Chapman Mays, Atlanta, Ga.

[73] Assignee: ACIS, Inc., San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/268,201

[22] Filed: Jun. 29, 1994

[51] Int. Cl.[7] .................................................. G06F 15/16
[52] U.S. Cl. ......................... 709/103; 709/107; 709/102
[58] Field of Search ................................... 395/673, 676, 395/677, 678

[56] References Cited

U.S. PATENT DOCUMENTS

| | | | |
|---|---|---|---|
| 5,355,484 | 10/1994 | Record et al. | 395/650 |
| 5,485,626 | 1/1996 | Lawlor et al. | 395/650 |

OTHER PUBLICATIONS

Armand et al, Multi–Threaded Processes in Chorus/Mix, EEUG Spring 90 Conf. 23–27 Apr. 1990.

Northcutt et al, The Alpha Operating System, Archons Project Technical Report, May 29, 1988 pp. 1–43.

Anderson et al, Scheduler Activations: Effective Kernel Support for the User Level Management of Paralelism, ACM 1991 p. 95.

Bershad, Brian Fast Mutual Exclusien for Unprocessors Dec. 1992 pp. 223–233.

Jones, Michael Bringing the E Libraries With Us Into a Multithreaded Future, Usenix, Winter 91.

Cooper et al, C Threads, Carnegie Mellon Univ. Sep. 11, 1990.

Cypher et al, Repeatable and Portable Message Passing Programs, PODC 94, pp. 22–31.

Loepere, Keith Mach 3 Server Writer's Guide, OSF, Jul. 15, 1992 pp. 51–56, 67–68.

Multithreaded Programming Guide, Sunsoft, 1994 pp. 11–19.

Birrell, Andrew An Introduction to Programming With Threads, Digital Systems Research Center Jan. 6, 1989.

Ford et al, Open OODB; A Modular Object–Oriented DBMS, Signed May 1993.

Peterson et al, Operating System Concepts, 1983, pp. 260–273.

Garlan et al, Adding Implicit Invocation to Traditional Programming Languages, IEEE, 1993.

Northcutt et al, The Alpha Operating System; Kernel Internals, Archens Project Technical Report pp. 44–114, 1988.

(List continued on next page.)

*Primary Examiner*—Lucien U. Toplu
*Attorney, Agent, or Firm*—Fenwick & West LLP

[57] ABSTRACT

A kernel for enforcing a hierarchical invocation structure prevents upcalls by executing kernel operations during each invocation of code unit of application by another code unit. Kernel operations determine the priority of the invoking unit of code based on the hierarchy of the invocation structure. Only invocations by either lower priority units, or the unit itself are allowed. Once invoked, the kernel operates to establish a priority for the invoked task. The kernel provides various event mechanisms to provide for priority based preemption concurrently with the enforced invocation structure, thus allowing the handling of asynchronous events in a multitasking environment. The event mechanisms allow a unit of code to signal the occurrence of a condition, which may be captured by other code units. The kernel determines the proper code unit for responding to the condition, and employs scope rules to further define the handling operation. Scheduling and tasking mechanisms schedule the handling of the condition and dispatch the handling of the event on a prioritized basis.

18 Claims, 24 Drawing Sheets

OTHER PUBLICATIONS

Marchin, de Philippe, Computer Design, "Multi–Level Nesting of Subroutines in a One–Level Microprocessor", Dallas, Texas, Feb. 1976, pp. 118–124.

Moore, B.G. and Chandrasekhara, M., Software Engineering for Telecommunications Switching Systems, Conference Publication No. 223, "Tools for Maintaining Consistency in Large Programs Compiled in Parts", Lund, Southern Sweden, Jul. 1983, pp. 93–97.

Van Der Poel, W., Appl. Sci. Res., "Dead Programmes for a Magnetic Drum Automatic Computer", Section B, vol. 3, 1953, pp. 190–198.

Koster, C.H.A. and Meijer, H., "Systematisch Programmeren in Algol 68", Kluwer, Dec. 1981, pp. 95–104.

Hansen, Per Brinch, California Institute of Technology, Operating System Principles "Deadlocks", Englewood Cliffs, New Jersey, 1973, pp. 122–131.

Ferrante, J., Ottenstein, K.J. and Warren, J.D, IBM Technical Report, "The Program Dependence Graph and Its Use in Optimization", Computer Science, Jun. 1984, pp. 1–33.

Brinch Hansen, "Operating System Principles", *California Institute of Technology,* 1973, pp. 122–130.

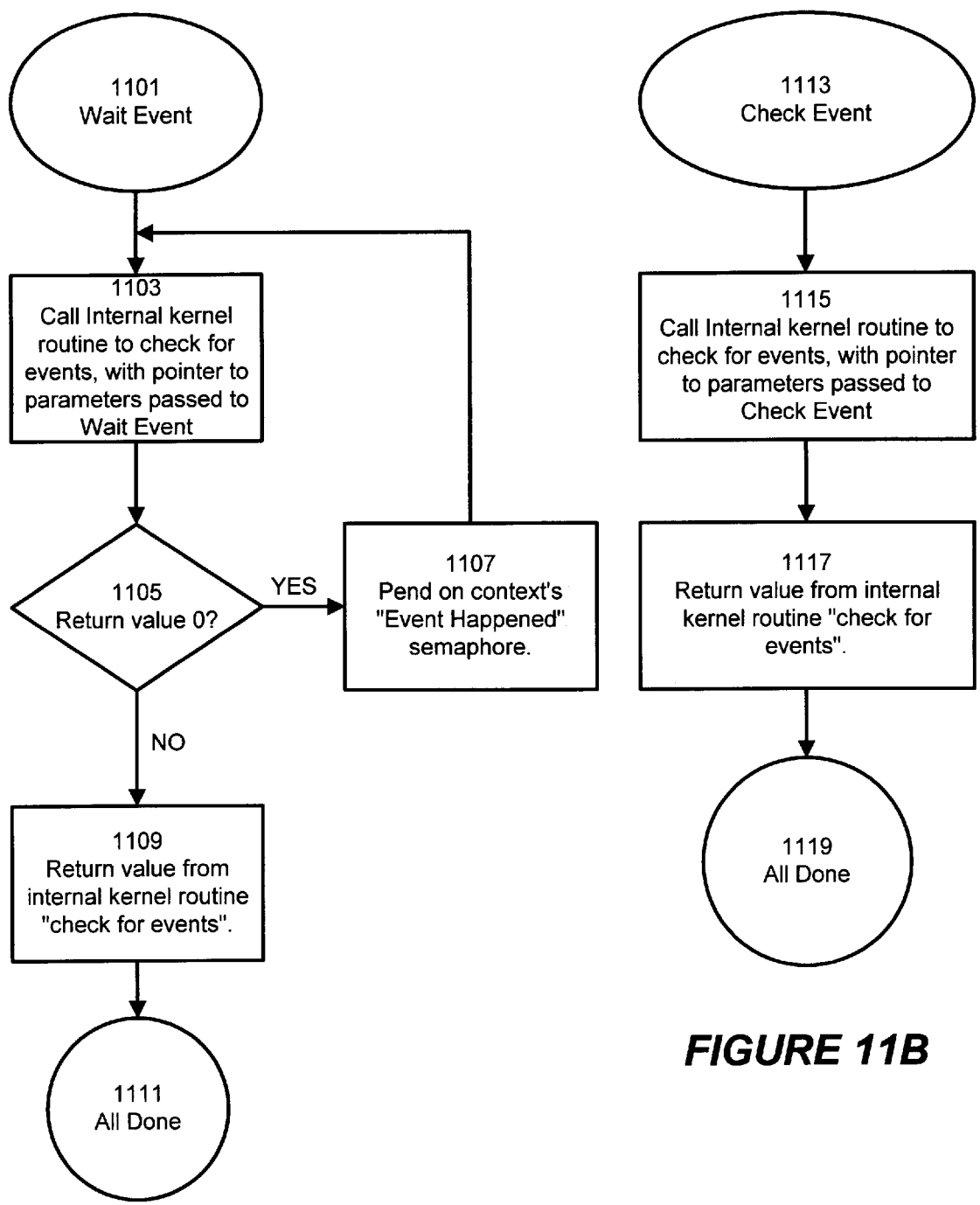

Schedule Event Routine
Preemptive, Multistack Kernel

Polling to Dispatch Event Routines
Polling, Single Stack Kernel

METHOD FOR ENFORCING A HIERARCHICAL INVOCATION STRUCTURE IN REAL TIME ASYNCHRONOUS SOFTWARE APPLICATIONS

BACKGROUND OF THE INVENTION

1. Field of the Invention

The present invention relates generally to the field of software architecture, and more particularly to methods for using kernels for controlling real time interactions within software applications.

2. Description of the Background Art

Software applications have been traditionally separated into real time applications, and non-real time applications. Non-real time applications have included conventional single user programs such as spreadsheets, word processors, graphic design programs, and the like. Software applications for controlling physical devices that must meet certain time dependent performance criteria have traditionally been considered real-time applications, and include such applications as flight control systems, industrial process control programs, and the like.

The division of software applications into the real-time and non-real time categories has normally been based on whether the operations required by the application are to be performed within a single thread of control. Conventionally, multitasking is used for the class of real-time applications in order to provide separate local storage for the various threads of control. A multitasking kernel provides mechanisms for the creation and synchronization of multiple threads of control, otherwise known as tasks, or processes. The local storage for each thread of control generally takes the form of a stack. A stack is a mechanism typically provided within the instruction set of most computers. A stack allows the invocation of a subroutine from multiple code sequences. The return address of the calling code sequence is pushed, i.e. saved, on the stack. When the subroutine is complete, the address is popped, or removed, from the stack and code execution continues from the calling code sequence. Multitasking programming environments used to create real-time applications provide multiple stacks, while traditional programming environments provide a single stack. Although multitasking is typically deemed necessary for real-time programming, software may be structured to respond to real-time events within each type of programming environment.

The increasing sophistication of software applications has blurred the traditional distinction between real time and non-real time applications. Sophisticated single user applications may perform background processing (such as spreadsheet recalculations) while waiting for user input. One general problem then to be solved in software development in both multitasking and non-multitasking environments is how to write software instructions that can "wait for" certain conditions, such as user input, external events, or data access, while continuing to process instructions for other purposes, thus providing multiple threads of control for various processes or tasks being executed by the software application.

The simplest solution to the wait for problem is to structure a program such that it is only waiting for one condition at a time. As an example, a simple mortgage amortization program may be written with a single thread of control that prompts the user for interest rate, number of payments, and the like, waiting for an input of each value before prompting for the next value. This simple program structure is sufficient for a large portion of extant software applications. However, if the nature of the application requires handling multiple, asynchronously occurring conditions, this program structure is not sufficient.

Programs written for single stack environments may handle multiple reoccurring real time events in several different ways. One possible single stack program structure for handling real time conditions requires the use of some sort of event, or message based kernel, to process the dispatching of code in response to asynchronous conditions. For these applications, the main body of the application consists of an event, or message handler, which must be able to reentrantly process various messages and events. This program structure is typical for a large number of graphical user interface based applications, since both the Microsoft Windows™ and Apple Macintosh™ operating systems provide this type of programming environment. Various kernel architectures may include queuing messages, and/or prioritized handling of messages.

All kernel architectures currently in use that depend on messaging between the application and the operating system are susceptible to two significant problems. Figure 1A shows a schematic illustration of the basic relationship between an application 91 interacting with a system kernel 93 via messages 97 from the kernel, and application programming interfaces 95 calls from the application 91. The first significant problem is that of unbounded recursion. If a message M, from the kernel 93 results in the application 91 calling the kernel function F, and if the kernel function F generates another message M, there is the possibility that this sequence may repeat itself indefinitely, and eventually exhaust the physical limits of the stack.

The second problem is known as non-reentrant code, and is typically a greater concern than unbounded recursion. In the preceding example, the kernel function F may be called a second time from the application 91, without finishing the first invocation of the function. If the function is not coded reentrantly, this may cause a programming error. Further, the message handler function within the application 91 is also subject to this reentrancy concern. The problems of unbounded recursion and non-reentrant code may also arise with respect to the internal structure of an application, where individual units of code may invoke each other during the execution process. Currently, the only way to ensure that these problems do not arise, either within the application, or between the application and the operating system, is through meticulous programming by the application developer.

Accordingly, it is desirable to provide a mechanism for eliminating the problems of unbounded recursion and non-reentrant code that removes the burden of avoiding these problems from the programmer.

A second class of problems arise where there is the need to handle multiple asynchronous processes for handling real time events. Applications in a single stack environment can not be structured to simply wait for a particular event or message without the undesirable effect of delaying all other event and message processing. One undesirable consequence common to all single stack implementations that attempt to responsively handle asynchronously occurring conditions is that these applications have to be state-driven. A state-driven application will remember its current program state by the setting of variables, and upon reception of a message, the state of these variables will determine the action taken by the application. The problem with state-driven applications is that it they are very difficult to write properly for handling wait for conditions, thereby increasing the likelihood of unbounded recursion and non-reentrant code. Accordingly, multitasking is used because of its greater facility in handling wait for conditions.

Although multitasking allows code to be structured with numerous disjoint wait for operations, this flexibility carries with it a price of increased complexity. In addition to the twin problems of recursion and reentrancy, the multitasking paradigm introduces the added complexities of critical sections and deadlock. Deadlock may occur when two processes are each waiting for an action by the other process in order to continue execution. Critical sections are individual segments of code that if executed concurrently by multiple threads may result in an error. These problems are well known to those skilled in the art, and techniques for avoiding these problems has been the subject of much research. However, as with the problems of reentrancy and recursion, the ultimate detection and correction of such problems relies upon the careful coding by the programmer.

The term software bug is often used to indicate both the presence of a programming problem, and the occurrence of an erroneous run-time condition. The more exact term for an incorrect code sequence is a program fault. A program failure denotes the manifestation of a program fault during execution of the code.

The problems of unbounded recursion, non-reentrancy, deadlock and critical sections may result in transient failures. These problems are transient in that they do not necessarily arise upon the single execution of the application, or even multiple executions, but rather, only where the interactions between the units of the application interact in a particular manner, typically after repeated executions.

These four types of programming errors belong to a class of programming errors called cyclic errors. These cyclic errors can be traced to the invocation structure of the software application. The invocation structure is the sequencing and calling relations between units of an application. The invocation structure can be illustrated with a directed graph. FIG. 1B shows a directed graph of the invocation structure of a software application 91 comprising of six code units A through F. An arrow from one unit to another indicates that the originating unit invokes the receiving unit with one or more procedure calls during its execution. In FIG. 1B then, although there may be a progression of instruction execution from unit A to unit B to unit E, there is certainly no progression of instruction from unit D to unit C.

Traditionally designed software applications are often very close to being purely hierarchical, with procedure invocations being illustrated by downward arrows. However, with the increasing need for handling of asynchronous events, the hierarchical invocation structure is gradually displaced, and inter-unit calls become increasingly non-hierarchical. This is illustrated by an upcall, such as the call 103 from unit E to unit A. This upcall causes a cycle (calls 101, 109, 103) in the directed graph. A cycle exists in a directed graph if there is a path following the direction of the arrows from one node back to itself. In the invocation structure illustrated in the directed graph of FIG. 1B, a cycle exists because of the upcall 103 creates a path, or a set of procedures calls that allow for unit A to invoke itself. The cycle in FIG. 1B between calls 101, 109, and 103 raises the twin concerns of non-reentrancy and unbounded recursion. Similarly, the possibility of deadlock can also be detected, here illustrated by a cycle with the calls 115, 117 between units D and E, wherein each unit calls the other during execution. Units B and C may be critical sections since they cannot logically call unit E simultaneously. It is primarily the existence of upcalls in the invocation structure that creates cycles. Cycles present in the invocation structure do not demonstrate that the cyclic errors exist, but rather indicate that such bugs are possible during the execution of the application.

A directed graph which contains no cycles is known as directed, acyclic graph, and represents a purely hierarchical structure. While a purely hierarchical invocation structure will eliminate the possibility of cyclic errors, it prevents the use of traditional techniques for handling asynchronous events necessary for real time performance. This is because these events are handled currently with either upcalls in single stack environments or by priority-based preemption in multitask environments. These types of programming methods do not enforce a purely hierarchical structure, and thus allow for the possibility of the cyclic errors. Currently, there is no programming methodology in common use that is applicable to application development for real time applications, and that prevents the appearance of transient failures. Further, there are no mechanisms in use today that enforce such a programming methodology.

From the foregoing, it is beneficial to the operation of software applications that they are developed using a method that creates an absolute hierarchy in the invocation structure of an application program, while allowing the program to operate for real time handling of asynchronous event. Although merely developing the software application with a hierarchical structure is sufficient to prevent the appearance of cyclic errors, in the absence of an external mechanism for enforcing the structure during run time, there is no way to guarantee the benefits that derived from the hierarchical invocation structure.

Accordingly, it is desirable to provide a software kernel for use in either single stack or multistack programming environments that enforces the hierarchical invocation structure actual run-time operation, thereby ensuring the benefits of the hierarchical invocation structure in the form of reduced cyclic errors cyclic error elimination.

In addition, since the enforcement of the invocation hierarchy precludes the traditional mechanisms for handling preemptive code, it is desirable to provide a kernel that provides for preemption and concurrency while coexisting with the enforced hierarchical invocation structure. Such a mechanism should preferably provide for maintaining a single thread of control within the application.

SUMMARY OF THE INVENTION

The present invention consists of methods for enforcing a hierarchical invocation structure between the components (contexts) comprising an application, for ensuring a single thread of control within an application, and for providing prioritized execution of event routines based on the priority of a context containing the event routines. One embodiment of a method for enforcing a hierarchical invocation structure includes the steps of indicating an invocation of an invoked context by an invoking context, determining the execution priority of the invoking context, and permitting the invocation if the execution priority of the invoked context is higher than the execution priority of the invoking context. Since each context has an execution priority associated with it, only a context having a lower execution priority may invoke a context having a higher execution priority. This prevents the occurrence of upcalls, which as shown above, lead to various cyclic errors. This method may be embodied in either multistack or single stack programming environments, or may be included in the instruction set of a microprocessor.

As a further refinement of the method, the step of determining the execution priority of an invoking context includes the steps of determining whether a context is invoking itself and determining whether the priority of the invoked context is higher than the priority of the invoked context. These steps provide for alternate handling of the invocation depending on the nature of the invoking context. Another refinement of the method provides that the step of permitting the invocation includes the further steps of storing an indicator of the invoking context for allowing the return of control to the invoking context, establishing an execution priority for an event routine in the invoked context based on the execution priority of the invoked context, and increasing a level of execution for the invoked context. These steps provide for control of the level of recursion, and a mechanism for establishing execution priority for various concurrently active contexts.

The invention also provides a method for enforcing a single thread of control within a context, where the application includes a number of contexts. The method determines a context for executing a routine, determine whether an active thread of control exists in the context for executing the routine, and then defers execution of the routine by the context until the context no longer has the active thread of control. The execution of the routine is continued when the context no longer has the active thread of control.

The invention also provides a method for the prioritized execution of scheduled event routines in a number of contexts in an application by scheduling an event routine in a context, and then determining if there is an active thread of control in the context. If there is no active thread of control in the context, the method assigns an execution priority to a task for executing the scheduled event routines, where the execution priority is the same as the execution priority of the context. The task for executing the scheduled event routines is then initiated. As a refinement of this method, the event routines are scheduled by indicating the occurrence of an event and a request for handling the event by a context. The method then determines a context for handling the event, and if there is an event routine in the handling context, the method designates the event routine for execution by a task. Because the task will be assigned an execution priority based on the execution priority of the handling context, all scheduled event routines associated with the task will be executed at that level of execution priority.

BRIEF DESCRIPTION OF THE DRAWINGS

FIGS. 11A and 11B are flowcharts for the Wait_Event and Check_Event routines in a preemptive multistack environment;

DESCRIPTION OF THE PREFERRED EMBODIMENT

Figure 1A:
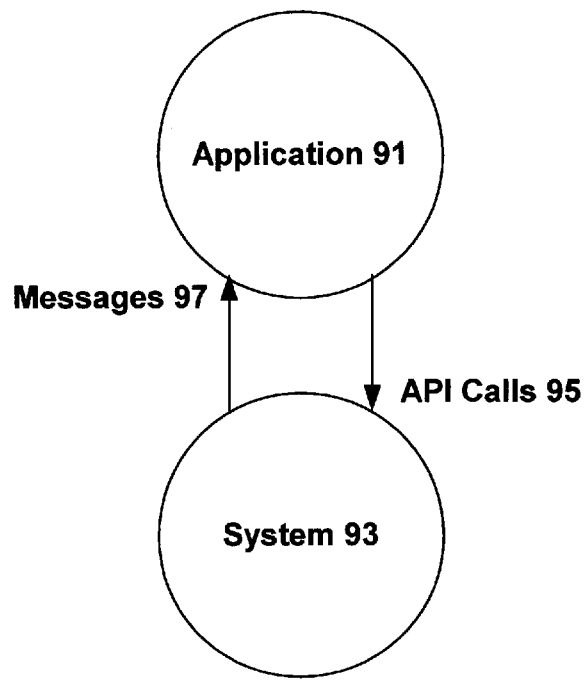
FIG. 1A is a illustration of the relationship between a software application and a messaging system kernel.

Before describing the various embodiments of the present invention, an analogy will help the reader understand the nature and operation of the invention.

A computer program may be viewed as a collection of instructions for solving an abstract problem. In a similar manner, people may be divided into various jobs to solve organizational problems. Consider the problem of managing a commercial fast-food establishment. The requirements of the organizational problem may be verbally specified, for example: servicing the drive-through window is to take precedence over the servicing of inside customers; the mean time for customer service is not to exceed three minutes; the french fries must be removed from the hot oil within thirty seconds of the timer expiring, and the like.

There are a large number of different ways of organizing various tasks to meet the requirements of the organizational problem. The efficiency of the establishment may depend on how effectively these tasks are divided among the employees. A business typically determines some system for organizing the tasks to meet the requirements, and provides written instructions regarding these tasks to each employee defining his particular duties. These written instructions are analogous to the written instructions within a computer program. Employees may communicate between one another to exchange information necessary to perform the various jobs, including requesting each other to perform certain tasks. In a similar manner, a computer program may be viewed as a collection of code entities (e.g. objects, modules, tasks) that communicate between one another to perform some function, (e.g. real time control, spreadsheet calculations, etc.).

One significant difference between human communication and computer instruction execution is that individual code entities attempt to execute every instruction they are given. In the fast food analogy, suppose the counter clerk is waiting for the manager to void a transaction, the manager is waiting to ask the cook how many burger patties need to be brought up from the freezer, and the cook is waiting for clerk to pick up a special order. Humans would soon recognize this cyclic deadlock condition, since each person is waiting for another person's action before performing their own would, and deviate slightly from their assigned instructions to break the deadlock. However, a computer program might sit indefinitely in this cycle of wait for conditions.

Now suppose the business management decided to increase the efficiency and reliability of the fast food establishment by implementing the following system:

Every employee is assigned a numeric rank.

Employees of the same rank are not allowed to talk to one another.

Employees of higher rank may command employees of lower rank to perform tasks.

Employees of lower rank may not initiate communication with employees of higher ranks, but may answer specific questions posed by higher ranking employees.

Employees of lower rank may signal a higher ranking employee by raising their hand if they believe they have information of value to a higher ranking employee.

These conditions would impose an hierarchical invocation structure on the employees, controlling if and when they may utilize information or services of other employees. While it is clear that a set of instructions conforming to this system could be written, there is little doubt that as applied to humans, such a system would be ineffective and counterproductive.

As applied to code entities in a software application, however, such a system imposes a hierarchical invocation structure on the code entities, and thereby beneficially eliminates the cyclic errors described above. The present invention provides a mechanism for enforcing such a hierarchical invocation structure. This is done by determining, each time a context invokes another context, whether the invoked context has a higher execution priority, i.e. rank, than the invoking context. If so, the invoked context is permitted to execute its procedures, thereby obtaining the active thread of control. If the invoked context is of lower priority, then this attempted invocation is a prohibited upcall, and the invocation is prevented from succeeding.

Applying and enforcing the hierarchy between code entities at the invocation level frees the programmer from the considerations of reentrancy, recursion, deadlock and critical sections during code development, and thereby speeds the development process. The present invention enforces this invocation hierarchy through the use of kernel operations. A kernel typically refers to the lowest layer of a software system. The invention can be described as a kernel since it provides a set of mechanisms closely analogous to existing operating system kernels. However, unlike extant operating system kernels, the kernel of the present invention requires the application that uses it to conform to a rigid internal code structure wherein the invocation structure is hierarchical. In addition, the kernel provides event mechanisms for the handling of asynchronous events within this hierarchical frame work, enforces a single thread of control, and for provides preemptive handling of operations.

Figure 2:
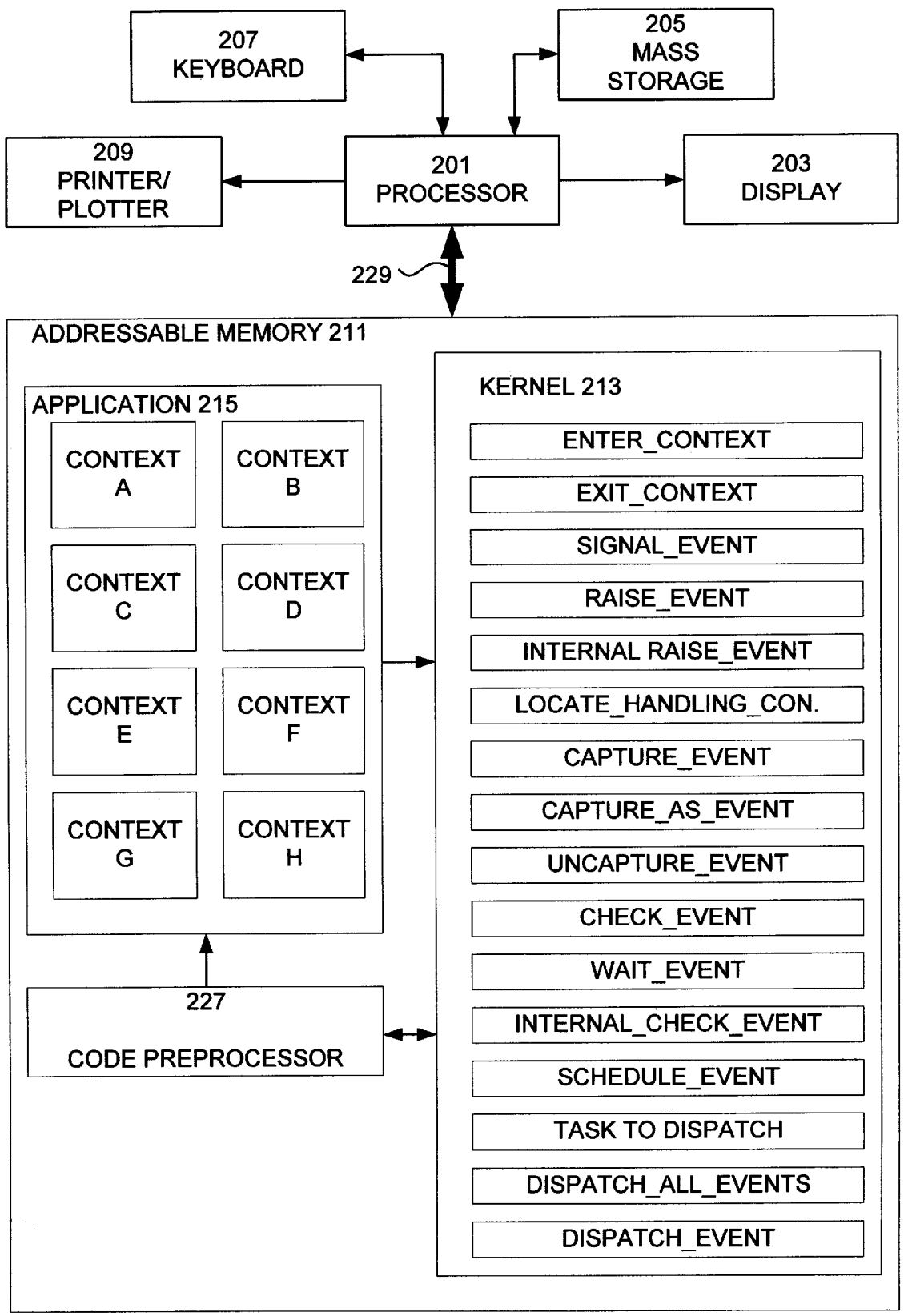
FIG. 2 is a block diagram of the system of the present invention.

Referring now to FIG. 2, there is shown a block diagram of the environment of one embodiment of the invention. The invention is embodied in a computer system including a microprocessor 201, a keyboard 207, a display 203, a printer 209, and a memory 211 for storing a software application 215 during both application development and run time execution. The software application 215 can be either for operation in either single stack or multistack environments, and is designed for real time handling of asynchronous events. The memory 211 also stores a kernel 213 embodying the present invention. The processor 201 communicates with the memory 211 via bus 229.

The software application 215 stored in the memory 211 is comprised of a number of contexts, or units of code, each for performing any number of operations or procedures in response to calls or invocations from selected other contexts. More specifically, a context is a unit of code that has included in it code statements that cause the execution of the hierarchy enforcement mechanism of the present invention. During operation new contexts may be added or destroyed as required. Each context has a nesting counter that serves as a flag to indicate that the context has been called to execute a procedure. Each context may also include event routines for responding to conditions signaled by other contexts. The control and sequencing of the event routines is further described below with respect to FIGS. 7 through 16.

Figure 3:
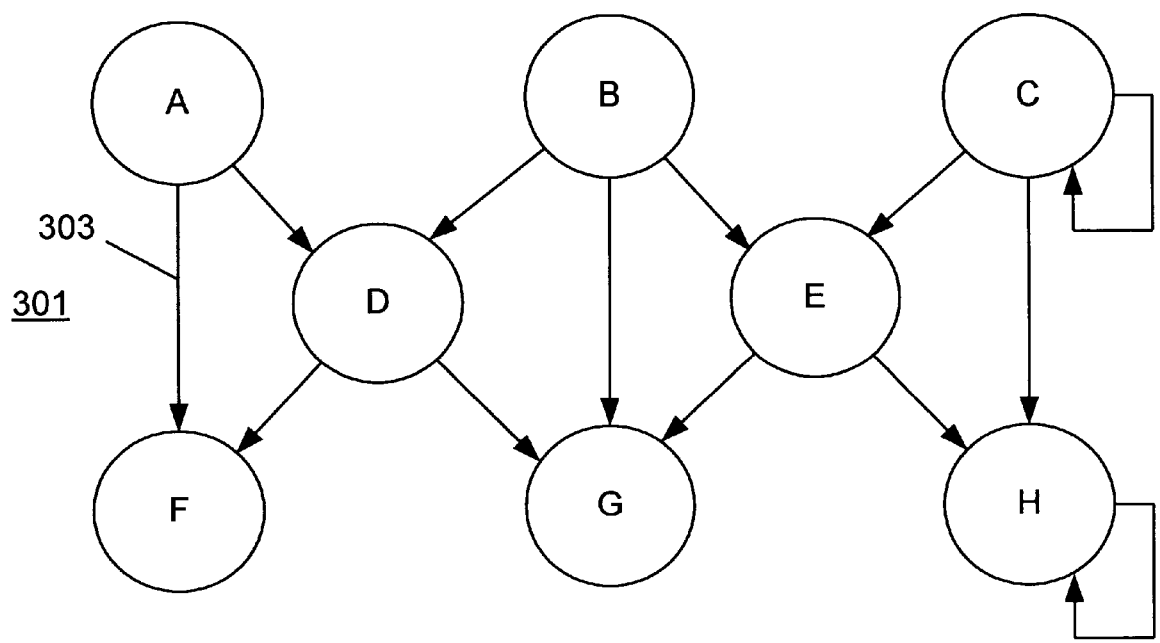
FIG. 3 is an illustration of the invocation structure of an application.

The invocation structure of an application 215 is the set of procedure calling relations between the contexts of the application 215. In an application 215 optimally developed for use with the invention, the invocation structure is hierarchical at all times. This means that there are no cycles present in a directed graph of the invocation structure. An example of a hierarchical invocation structure 301 is shown in FIG. 3. FIG. 3 illustrates with a directed graph a hierarchical invocation structure 301 for the software application 215 of FIG. 2. In FIG. 3 each context makes procedure calls 303 only lower level (hence higher priority) or to itself. Because the invocation structure 301 is hierarchical, there are no upcalls, which are procedure invocations from a lower level context (shown near the bottom of the figure) having a higher priority to a higher level context having a lower priority. The prohibition on upcalls results in the invocation structure 301 having no cycles in the directed graph, and thus eliminates the possibility of the cyclic errors of deadlock, unbounded recursion, critical sections, or non-reentrancy.

At a conceptual level, each context may be viewed as a separate thread of execution in a real time application processing asynchronous events. A context invocation may then be viewed as a request from one procedure to another. The programming methodology used with the invention requires that no more than one thread of control is active within the scope of a context at any given time, and the invention provides a mechanism to enforce this requirement. The scope of a context includes all the procedures defined with a context. As long as these conditions are not violated, the actual inter-context invocation may take one of several forms currently in use. Accordingly, the invention has various embodiments that enforce the hierarchical invocation structure 301 of an application 215.

Enter and Exit Context Operations

Figures 4A, 4B:
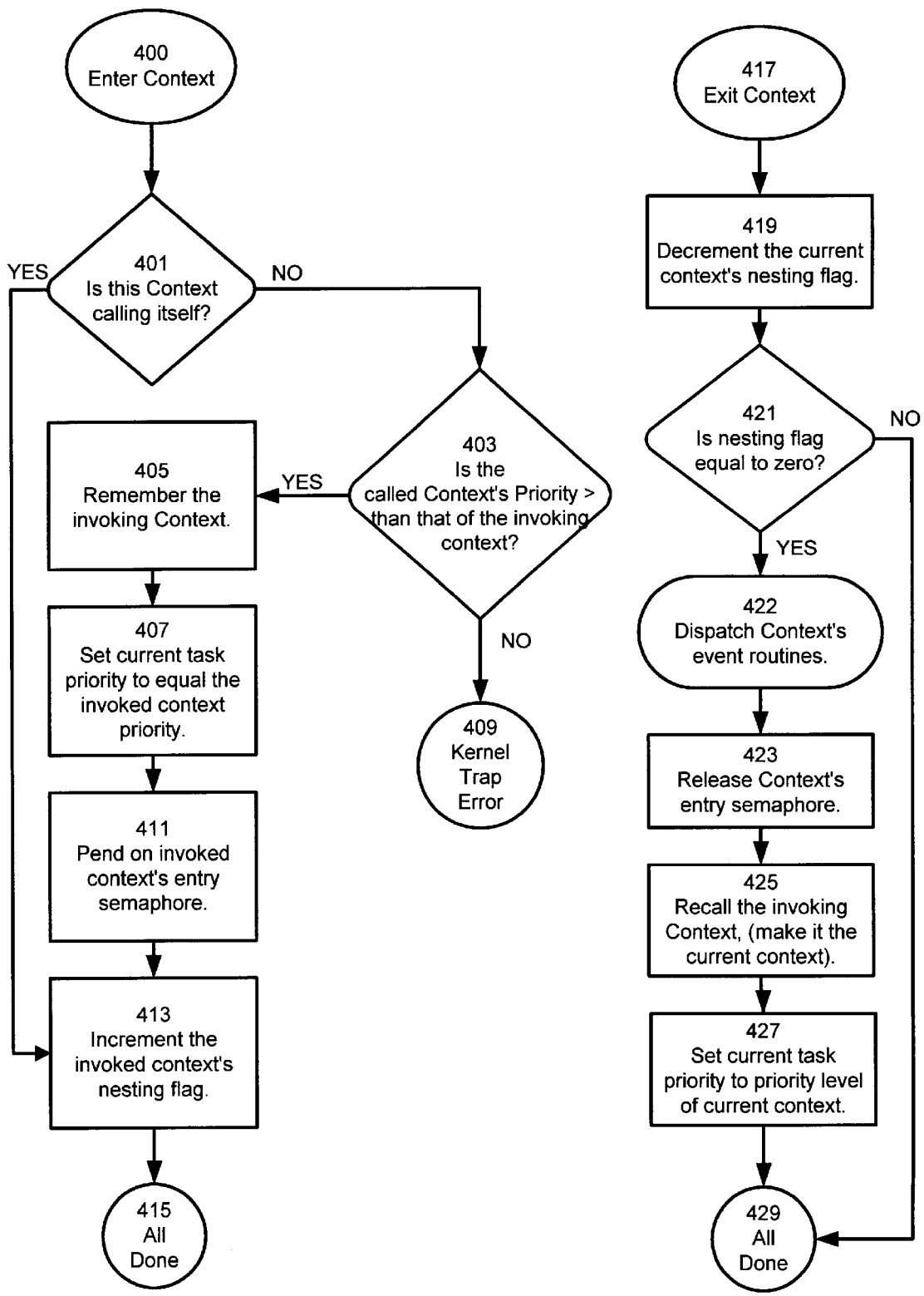
FIGS. 4A and 4B are flowcharts for the Enter_Context and Exit_Context routines in a preemptive multistack environment.

To enforce the run-time checking of the hierarchical invocation structure, the kernel 213 performs two types of invocation related operations, Enter_Context and Exit_Context operations, that are executed by the processor 201 during context invocations and returns. These operations allow the kernel 213 to enforce the invocation hierarchy by preventing higher priority, low level contexts from directly invoking lower priority, higher level contexts. Referring now to FIGS. 4A and 4B, there are shown flowcharts for the Enter_Context and Exit_Context operations, as embodied in a preemptive multistack environment.

Figure 1B:
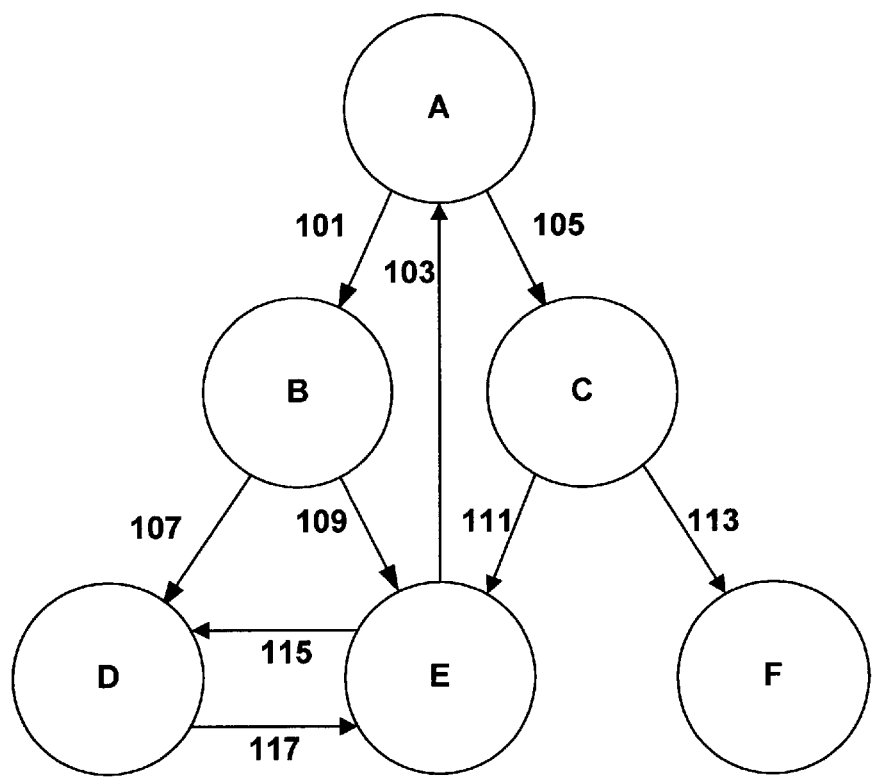
FIG. 1B is a illustration of the invocation structure of a software application including a number of contexts.

FIG. 4A shows the Enter_Context operation 400. The Enter_Context operation 400 is resident in the kernel 213 and is performed by the processor 201 when a context invokes another context. First, the processor 201 determines 401 if the context is invoking itself. Intra-context calls are permissible and provide for recursion. Unbounded recursion is not a significant problem with intra-context calls because it is easily identifiable in the code itself, and can be readily handled with the nesting counter, with a limit on the number of recursive calls. Accordingly, if a context is invoking itself, a nesting counter for the context is incremented 413. This flag further indicates that the context has an active thread of control. If the context is not invoking itself, but calling another context, then the processor 201 determines 403 if the priority of the invoked context is greater than the priority of the invoking context. This step preserves the hierarchy of the invocation structure because it checks whether an upcall is being attempted, that is, whether a higher priority, low level context is attempting to invoke a low priority, high level context, as illustrated in FIG. 1B. If an upcall is being attempted, than the processor 201 traps 409 the error and signals it to the application 215.

If the invocation is properly from a low priority context to a high priority context, than the processor 201 stores 405 a pointer to the invoking context on a stack in the memory 211, allowing the processor 201 to return the thread of control to the invoking context at a subsequent time. The processor 201 then sets 407 the priority of the procedure called to the priority of the invoked context. This allows the processor 201 to schedule various procedures being called in contexts of differing priority, as further described below with respect to FIG. 7 and 15 through 16.

The processor 201 then waits for 411 a semaphore, or the like, from the invoked context indicating that the context has been entered, and is actively executing a task. The execution of a task by a context is further described below with respect to FIG. 15A.

Finally, the processor 201 increments 413 the nesting counter of the invoked context, indicating that context has an active thread of control. Assuming the context has the highest priority, the invoked task or procedure is executed by the invoked context. Once the context is finished executing, the Exit_Context operation 417 is performed by the processor 201.

In summary, the Enter_Context operation occurs upon each invocation of a context, and only allows the invocation where the invoked context has a higher execution priority than the invoking context. Once the invocation is allowed, additional steps preserve information regarding the invoking context, for returning execution to the context, and also track the number of times the invoked context has been invoked for tracking recursion and reentrancy. In addition, by waiting on a semaphore, or the like, from the invoked context prior to allowing a further invocation, the operation helps ensure only a single thread of control.

FIG. 4B is a flowchart for the Exit_Context operation. This operation is executed upon the completion of each context's operation. First, the processor 201 decrements 419 the nesting counter of the invoked context, indicating that it has completed one level of execution. The processor 201 tests 421 whether the nesting counter has reached zero, indicating that the context has completed all invocations. If not, then the processor 201 returns 429 control to the invoked context, allowing it to continue execution. If the invoked context's nesting flag is equal to zero, then the processor 201 dispatches 422 the context's event routines. This step ensures that all of the event routines associated with the context are completed prior to the present invocation being completed. This step is done according to the routine shown in FIG. 16. The processor 201 then releases 423 the context's entry semaphore, indicating that the context no longer has the active thread of control. The processor 201 restores 425 the invoking context using the stored pointer on the stack, and sets 427 the priority level of the currently executing task to the priority level of the current context, that is, the invoking context.

Figures 5A, 5B:
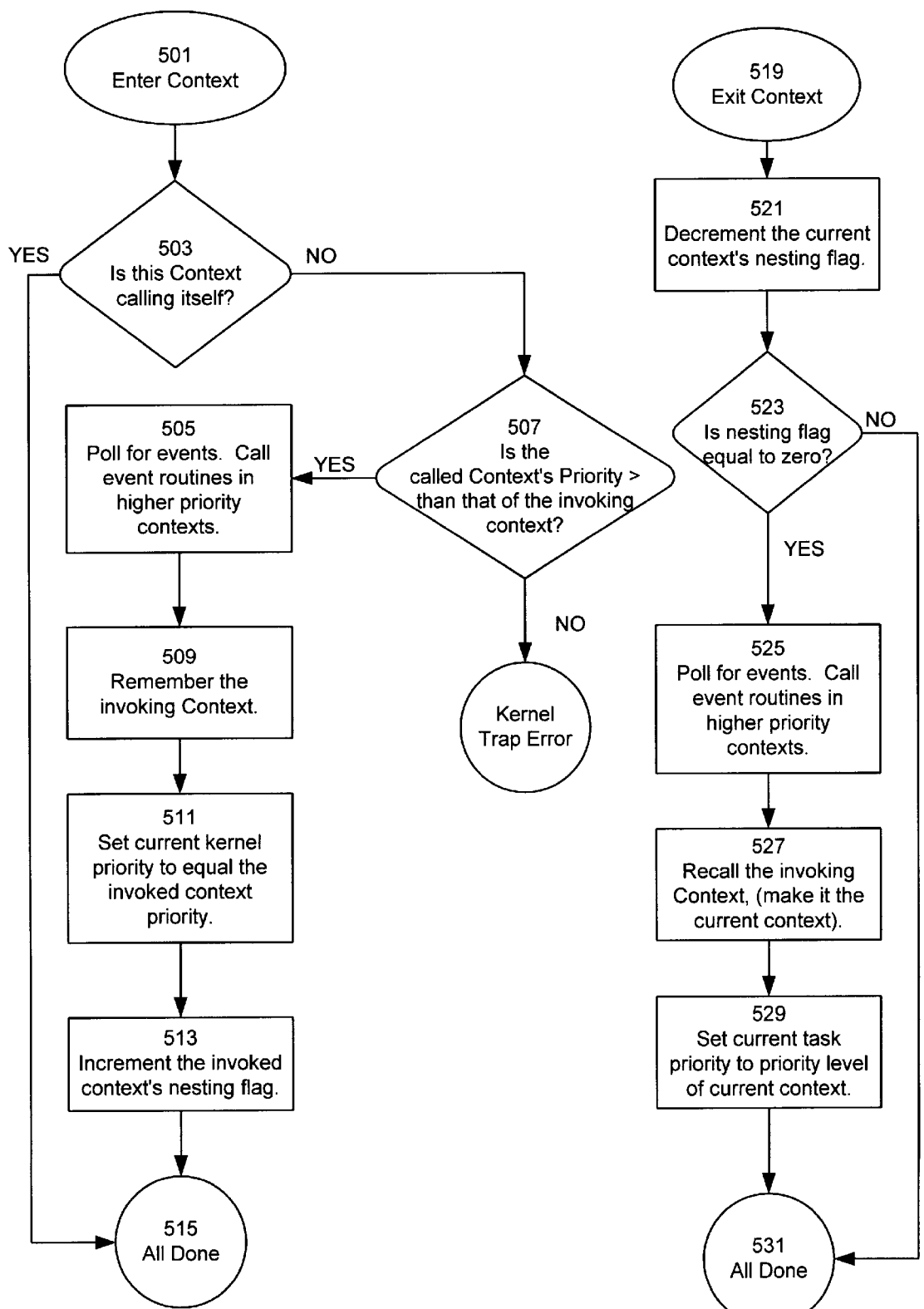
FIGS. 5A and 5B are flowcharts for the Enter_Context and Exit_Context routines in a polling single stack environment.

The Enter_Context 400 and Exit_Context 417 operations can also be embodied in a kernel 213 for a polling, single stack environment. The flowcharts for such operations are shown in FIGS. 5A, and 5B. The use of these operations is functionally the same as with the preemptive implementation, the basic difference being that the kernel 213 polls 505 for events after determining 507 that the invoked context is of higher priority than the invoking context. The distinctions between polling and preemptive environments is further discussed below. The polling operation is described below with respect to FIG. 15B.

The kernel 213 for enforcing the hierarchical invocation structure during run-time may be embodied in various forms, according to the implementation requirements of the system with which the invention is used. Since the Enter_Context and Exit_Context operations must be performed upon each context invocation and return, the preferred embodiment of the kernel 213 is to provide these operations in the instruction set of the processor 201 that executes the application 215. In that embodiment, when the application is compiled, the compiler integrates the necessary code for executing these operations. Alternatively, the context operations can be included in the operating system used by the processor 201, and provided either in software or firmware. In either case, the programmer would not have to manually code the context operations during application development.

The kernel 213 of the present invention may also be viewed as a library of routines that may be called from code developed under the programming methodology described herein. The kernel 213 can then be linked into the address space of the application 215, as illustrated in the FIG. 2. In another alternative embodiment, the use of the kernel 213 can be facilitated in a programming language that directly supports the programming methodology employed with the invention and the use of programming language syntax for effecting the operation of the kernel 213. Sample pseudo code for such a language is illustrated below with respect to the kernel operations of the present invention.

Finally, in the absence of direct incorporation into either the instruction set of the processor 201, the operating system, or a new programming language, the present invention can be implemented in existing computer systems using a code preprocessor 227. The code preprocessor 227 operates similarly to existing cfront preprocessors, that, for example, convert C++ code into the C programming language. In this embodiment, the code preprocessor 227 integrates programming language abstractions into an existing programming language, preferably C++. While the invention does not require a the use of the C++ language, C++ is the preferred programming language due to the elegance of the code, as well as the protection against programming errors. The embodiment of the invention as a kernel 213 and a code preprocessor 227 prevents the omission of the Enter_Context and Exit_Context operations, by always integrating the context operations into the applications procedure calls, thereby sparing the programmer from having to manually provide for these operations.

The code preprocessor 227 allows a programmer to use various programming language extensions, that when processed by the preprocessor 227, link the Enter_Context and Exit_Context operations into the application code. The function prototypes for these operations are shown in Appendix A. A pseudo code example is a follows:

```
Context Message_Box
{
  public:
    Message_Box();
    char buffer[80];
    Service
    void New_Message( char * new_message)
    {
      strncpy(buffer, new_message, 80);
    }
}
```

The Context keyword in this pseudo code is similar to the C++ Class keyword. The Service keyword is an indication that the New_Message method is intended to be invoked by other contexts. In the absence of the Service keyword, the code preprocessor 227 will move the method declaration into a private: section of the class definition. The code preprocessor 227 would take the preceding code and produce the following C++ output:

```
#include "kernel.hxx"
Class Message_Box : public K_Context
{
  public:
    Message_Box();
    char buffer[80];
    void New_Message( char * new_message)
    {
      K_Context_Protector dummy(this);
      strncpy(buffer, new_message, 80);
    }
}
```

The include statement conventionally identifies a header file in the code library that is to be used by the code preprocessor 227 for integrating the desired code expressions referenced by the language abstractions. The code preprocessor 227 includes the kernel.hxx header file in the precompiled code to ensure that the K_ abstractions are defined. The Context keyword is an indication that the class for the Message-Box object should be derived from the K_Context class, which is defined in the kernel header. The K_Context_Protector variable, dummy, takes the current this pointer in its constructor. The constructor of the dummy variable simply performs the K_Enter_Context kernel operation, and the destructor performs an K_Exit_Context operation. The code ensures that both operations are performed on context entry and context exit.

Events

Thus far one aspect of the invention, the enforcement of a hierarchical invocation structure using the kernel 213 has been described. A further aspect of the invention is the provision of preemptibility in such a hierarchical invocation structure.

As described above with respect to FIG. 1B upcalls from a lower level code unit to a higher level unit create the possibility of cyclic errors. The programming methodology used with the invention prohibits the use of upcalls in order to eliminate this class of program failures. However, in order to provide for real time handling of asynchronous events in either preemptive or polling environments, it is still necessary to provide a mechanism for allowing lower level context to initiate execution of a higher level context.

Accordingly, an event mechanism is provided by the invention to convey the occurrence of a condition from a lower level context that may be of significance to a higher level context. The use of events in the invocation structure results in a demand-driven program structure, where parameter passing between contexts is always initiated by the higher level contexts. The event mechanism provides a way of scheduling the execution of code within a higher level context. This code execution is deferred until the high level context can process the request by handling the event following the completion of a low level, higher priority context. The function prototypes for the various elements of the event mechanism are shown in Appendix A.

In the preferred environment, events may be defined by the use of the Event statement. Events defined within the scope of a context are considered local to the context, and events that are defined outside the scope of a context are considered to have global scope.

```
Context Device
{
  Event       oops;
  .
  .
  .
};
```

This pseudo code programming example illustrates the definition of the event oops, using a C++ syntax for referencing the event.

The simplest implementation of an event is to allocate a variable for the event in the structure that is allocated with the Device context. The address of the variable provides a handle for the event operations performed by the kernel 213. This implementation is sufficient for a kernel implementation that is intended to be linked into an application 215.

The term programming idiom has been used to describe a technique of using a programming language feature. One of the programming idioms that is useful in one embodiment of the invention is the use of an Event_Handle. A context may define an event, capture the event, and pass a handle to one or more contexts that may later signal the event. In the one kernel implementation, the Event_Handle is merely the address of the event variable. In a more complex kernel implementation, the creation of an event may result in the allocation of storage within the address space of the kernel itself, and the Event_Handle would be simply an abstract key that the kernel 213 would interpret to determine the appropriate operations. A pseudo code example for obtaining the handle of an event is as follows.

Event_Handle eh;

eh=Event_Handle( oops );

The kernel 213 may perform operations on Event_ Handles syntactically as though the operations were performed directly on the event.

Signaling & Raising Events

The invention, in its various embodiments, provides mechanisms to "signal" and "capture" events. Signaling refers generally to a mechanism for indicating that a context is notifying another context of a condition that may be importance to the other context. Capturing refers generally to a mechanism by which a context indicates that it is to be notified of a signaled condition. Returning to the fast-food establishment example, a signaling mechanism would inform individual high ranking employees that a lower ranking employee needs to communicate with some high ranking employee. A capturing mechanism would allow a high ranking employee to set conditions for notifying him, such as notifying the manager when the counter clerk signals. Where many different employees of differing rank are attempting to receive communications from other employees, it becomes necessary to schedule the inter-employee communications. As the high ranking employees dispatch their requests, lower ranking employees may perform their duties. The invention provides mechanisms for enforcing this communication and execution structure on the contexts of an application 215.

Since the invention requires only one active thread of control within the scope of context at any given time, the signal and capture mechanisms allow the kernel 213 to manage the active threads of control and provide for deferred scheduling of tasks, and hence allow for preemptive or polling multitasking. These mechanisms are sufficiently expressive to allow the development of source code which complies with the programming methodology used with the present invention. In general, there is a tradeoff between providing increased complexity within the event mechanism, versus extra requirements within the source code for the handling of events.

More specifically then, two mechanisms are provided by the kernel 213 to "signal" the occurrence of an event, the Signal_Event and Raise_Event functions. Two mechanisms are also provided in this embodiment to specify the "capture" of an event, the Capture_Event and Seize_Event functions.

An event may be signaled in either of the following ways:

Signal( oops );

Raise( oops );

The Signal() function is a C++method defined for the Context class, which is translated into the Signal_Event kernel function by the code processor 227. Similarly, Raise () is method that is translated by the code preprocessor 227 into a call to the kernel function Raise_Event, which takes an extra parameter identifying the context which is raising the event. These functions differ only in their determination of the scope, which is used by the kernel 213 to locate a capturing context for handling the signaled event. The Signal_Event function has global scope. Any context in the application 215 may capture the event. The Raise_Event function has a more limited scope determined as follows:

1. Only contexts above (of a higher level, lower priority) may capture an event that is raised by another context.
2. If an active thread of control exists in the context which is raising the event, only contexts which are part of the "call chain" may capture the event.
3. If the event is raised by a context that does not have an active invocation, the scope of the event is limited to all contexts having a lower priority than the context raising the event.

Figure 6:
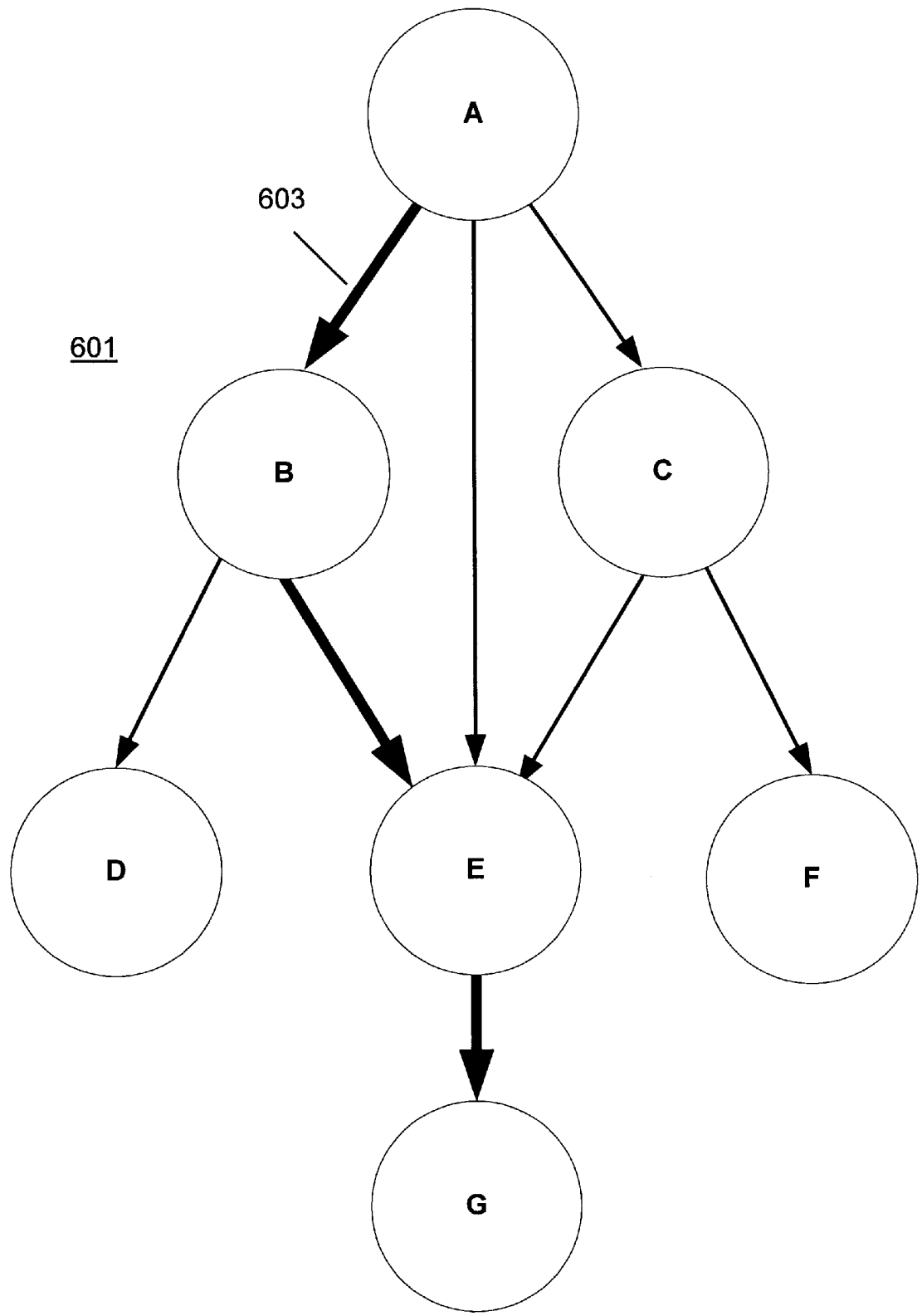
FIG. 6 is an illustration of the invocation structure of a software application.

A call chain may be thought of as being comprised of the contexts with return addresses on the current stack. FIG. 6 shows an invocation structure 601 for a software application 215 comprised of a number of contexts. In FIG. 6 there is shown a call chain 603 include the path <A,B,E,G>, illustrated by the heavy arrows coupling contexts A, B, E, and G.

If context G raises an event while there is an active call chain from A to G, only those contexts in the call chain are eligible to capture the event. If context G signals the same event, any context within the application 215 may capture the event. The above scope rules are used in the Locate_Context routine described with respect to FIG. 7D, below. The use of a call chain to refine the scope of the capturing context is similar to existing exception mechanisms.

Figure 7A:
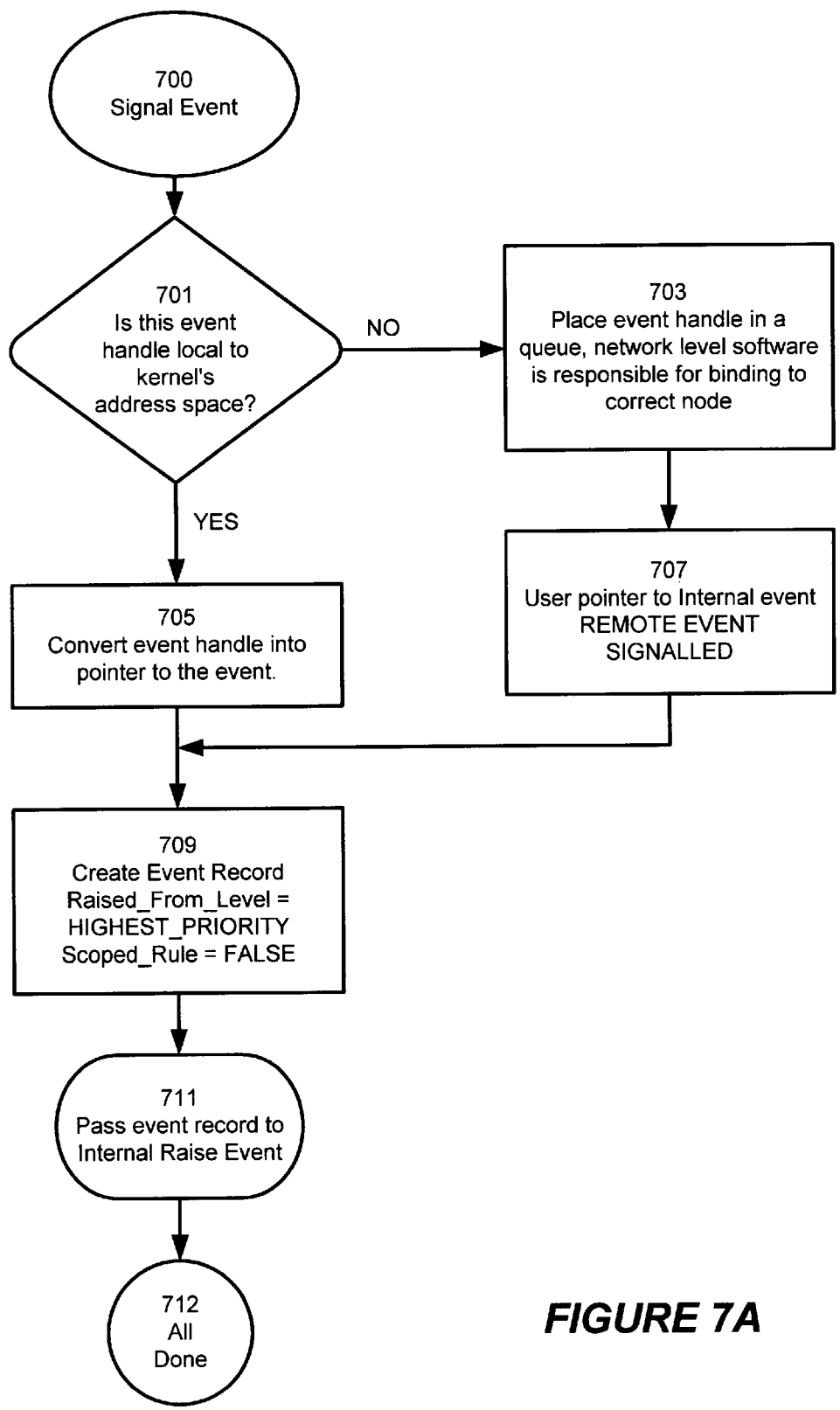
FIGS. 7A and 7B are flowcharts for the Signal_Event and Raise_Event routines.
Figure 7B:
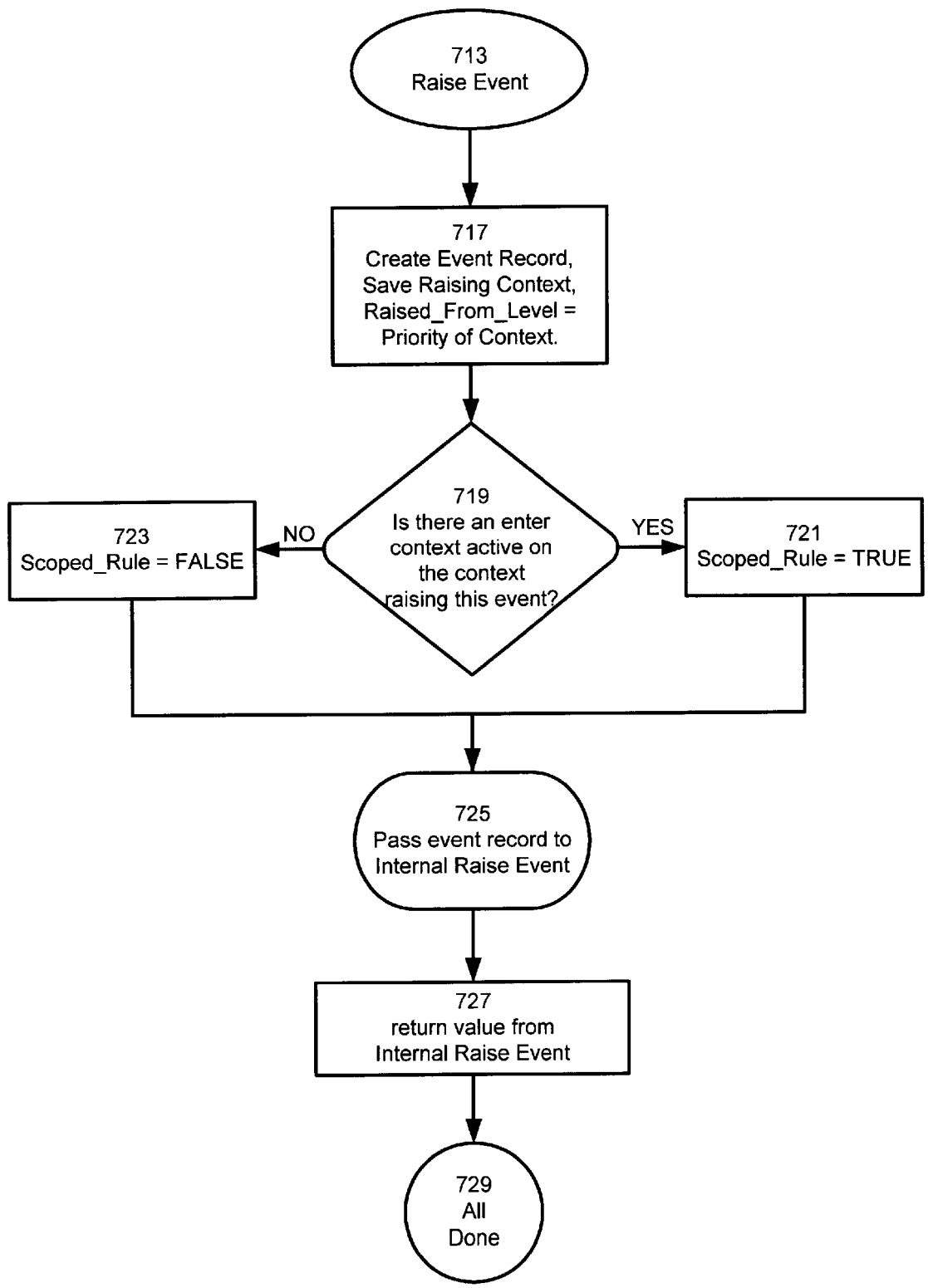

Referring now to FIG. 7A and 7B, there are shown flowcharts for embodiments of routines for the signaling and raising of events by contexts.

The Signal_Event operation 700 allows a context to indicate that a specific condition has occurred within some context in the application 215. Once signaled, one of the contexts that have previously registered for notification ("capturing") of the condition is designated for handling the event and the event is performed by the handling context according to its execution priority. In FIG. 7A one embodiment of a Signal-Event operation 700 begins execution by determining 701 whether an event handler passed as the parameter of the operation is local to the address space of the kernel 213. If so, the event handle is converted 705 into a pointer to the local event. If not, the event is dependent on routines external to the application 215, and the event handle is placed 703 in a queue made available to the operating system and other applications on the network. A pointer to an internal event indicating that some remote event has been signaled is thus used 707 instead of the pointer to the local event. An event record is created 709 using the one of the event pointers and a flag setting the priority of the event is set to highest priority. The event record includes a pointer to the event being signaled or raised, the priority of signaling or raising context, and a flag for the use of the scope rules. Since signaled events have global context, the scope flag is set to false for signaled event. This gives the event a global scope and allows it to be captured by any context in the application. Since the priority of the event is set at the highest value, it will be handled by the highest priority context that is capable of doing so. The event record is then passed 711 to an internal operation of the kernel 213 that determines the proper context for handling the event based on the priority of the signaling context. This routine is further described below with respect to FIG. 7C.

In FIG. 7B, there is shown the flowchart of one embodiment of a Raise_Event operation 713 for use in both preemptive and polling environments. Similar to the Signal_Event, the Raise_Event is used to give preference to the capturing contexts within the call chain of the raising context. An event record is created 717 using the pointer from the passed event. However instead of assigning the event the highest priority as in the Signal_Event operation 700, the event is assigned the priority of the context that raised it. This ensures that only contexts that are of lower priority than the raising context will handle the event. This step helps implement the first scope rule, above. The kernel 213 then determines 719 whether there is an Enter_Context operation active in the context that raised the event, based on the status of the context's nesting counter. If the context has an active Enter_Context, and hence is the active thread of control, then a flag is set 721 indicating that the scope rules are in use, and hence only contexts in the call chain can handle the event. This helps implement the second scope rule. If there no active thread of control, the flag is set 723 false. The event record is then passed 725 to the internal raise event routine, and upon obtaining a return value 745 from the routine, that value is returned 727 to the signaling/raising context. The return value indicates whether a context for handling the event was located.

Figure 7C:
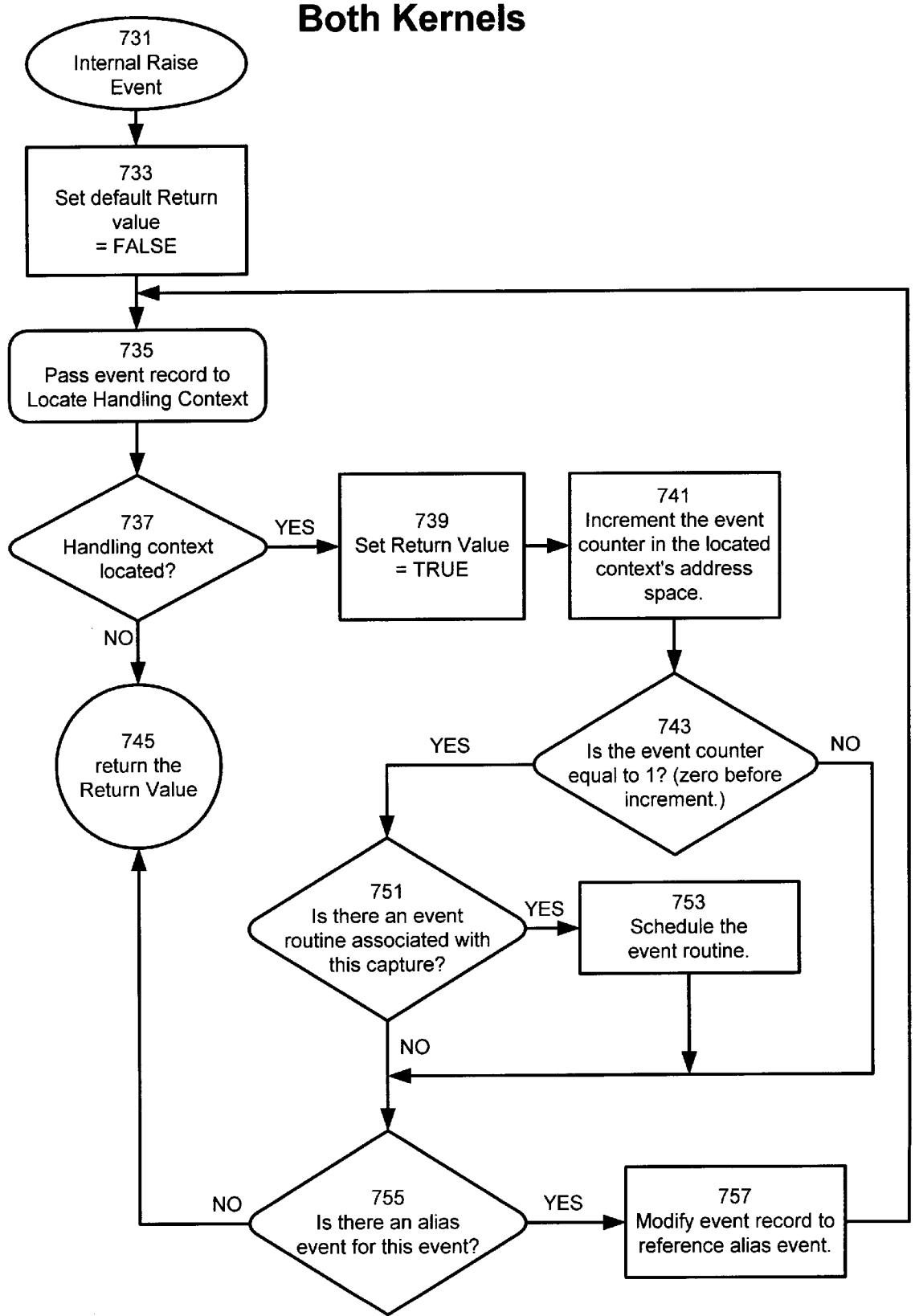
FIGS. 7C, 7D, and 7E are flowcharts of the Internal Raise and Locate Handling routines.

FIG. 7C shows a flowchart for an embodiment of the internal raise event routine 731. Here, the routine sets 733 its default return value to false, and then passes 735 the event record to a Locate_Handling_Context routine internal to the kernel 213 for determining the proper context for handling the signaled/raised event according to the above scope rules. Once that subsequent routine is completed, the n the kernel 213 determines 737 whether a context has been identified to handle the event. If so, the return value is set 739 to true, and the event counter in the address space of the located context is incremented 741; this counter was established when the context captures the event, as described below. The counter tracks the number of occurrences of an event.

The event counter is tested to determine 743 the number of times the event is being handled. If the counter was just incremented to one, then the event has not previously been handled during the current invocation, and it is necessary to schedule an event routine for handling the event. If the counter is greater than one, an event routine for handling the event has already been scheduled, and the method need only track the number of executions for the event routine.

In order to schedule an event routine for the event, the kernel 213 determines 751 if there an event routine associated with the signaled/raised event. If so, the kernel 213 schedules 753 the event routine, by calling an internal scheduling routine. The scheduling routine is further described below with respect to FIG. 14A. Otherwise, the kernel 213 determines 755 if there is an alias event for the signaled event, and modifies 757 the event record to reference the alias; the event record is again passed to the Locate_Handling_Context to further locate a context for handling the alias event. If no context for handling the event was located 739, then the return value (set at false) is returned 745.

Figure 7D:
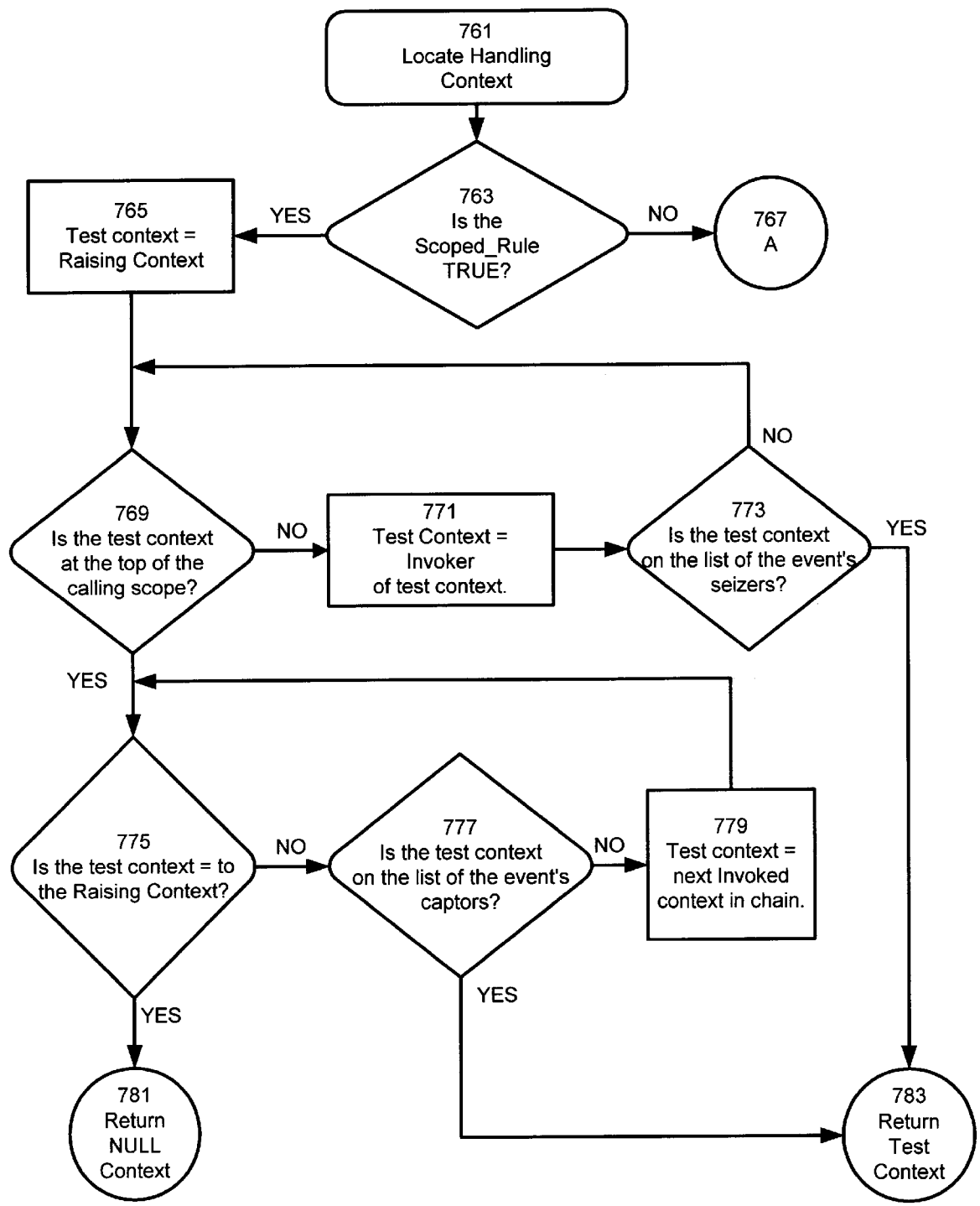
Figure 7E:
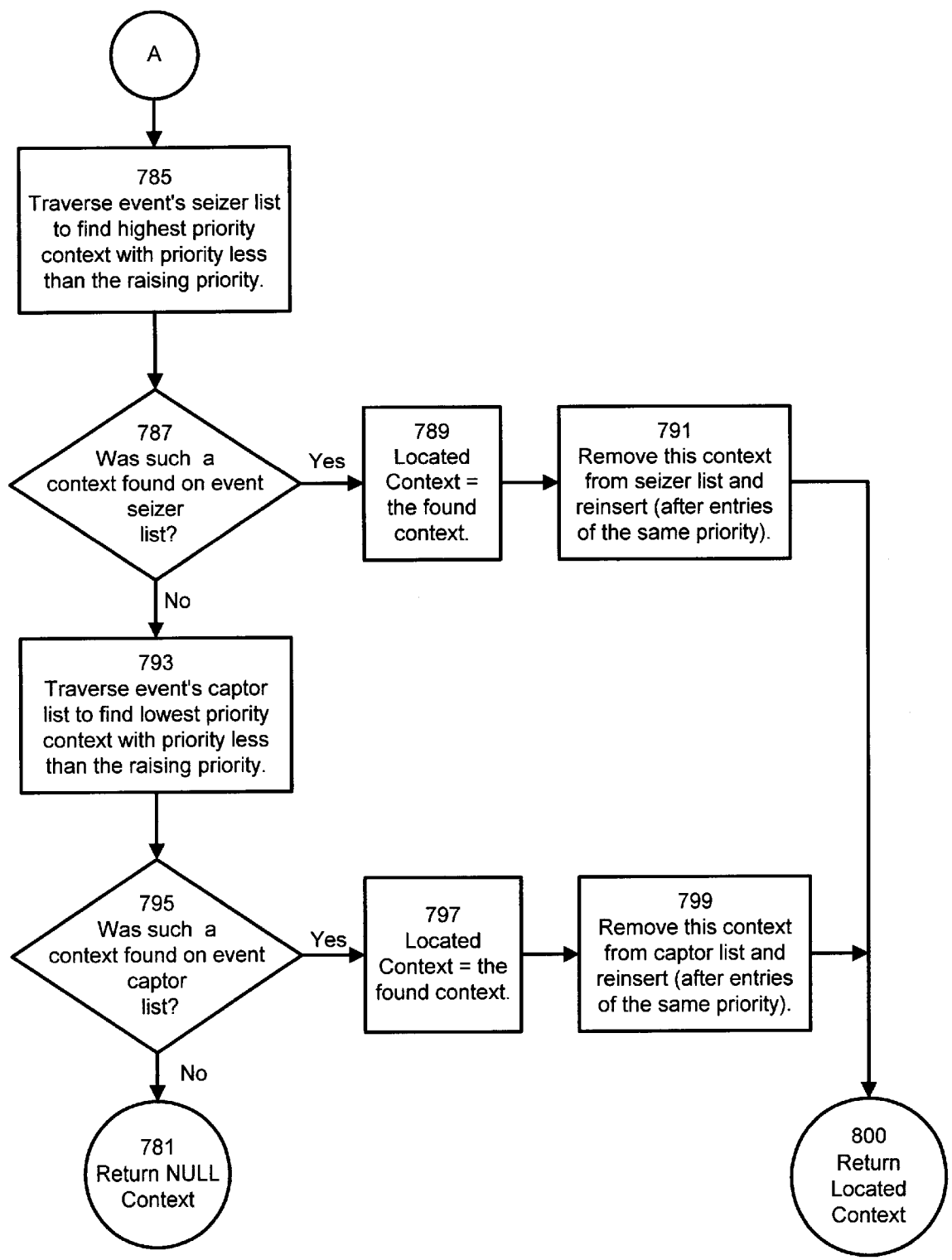

FIG. 7D shows a flowchart for one embodiment of a Locate_Handling_Context routine. This routine operates internal to the kernel 213 and is used to determine the proper context for handling an event, using the scope rules set forth above when an event is being raised. First, the kernel 213 determines 763 whether the scope flag for the use of the scope rules is set true. If so, the scope rules are used as follows.

A test context is set 765 to the raising context. The scope rules are applied by determining 769 if the test context is at the top of the calling chain. If not, the test context is set 771 to the context that invoked the test context, and the test context is now tested to determine 773 if the test context is on a list of seizing contexts. If not, step 769 is repeated. If the test context is a seizing context, then it is returned 783 to the calling routine. If the test context was at the top of the calling chain, then the kernel 213 determines 775 if the test context is still set to the raising context, and if it is, the routine returns 781 a null context, because there would only be one context in the call chain. If the test context has been set 771 to another context, then if that context is on a list of capturing contexts 777, it is returned 783 to the calling routine. Otherwise, the test context is set 779 to the next invoked context in the calling chain. This loop is repeated until the lowest priority, highest level context that is set to capture the event is located.

An example illustrates the use of the scope rules. Assume the call chain shown in FIG. 6 is currently active, and context G has raised an event. Assume further that only context B has captured the event, that is, it requires notification of the signaling from context G. Since the call chain is active, and the event is raised, the scope flag is set 721 in the Raise_Event routine. In the Locate_Handling_Context routine then, the test context would be set 765 to context G. This is tested 769 for being at the top of the call chain. Since context A is at the top of the of call chain, the test context is reset 771 to context E, which is the invoker of context G. The test context is tested 773 to determine if it is on a list of seizing contexts. If context A has indicated seizure of the event, then it would be returned 783 as the handling context. Assuming for the purposes of this example that it is not, then the test at step 769 is repeated, and again the test context, now context E, is not at the top of the call chain. Accordingly the test context is set 771 to context B. Context B is likewise tested for inclusion on the list of seizing contexts. Since context B has indicated a capture of the event, the loop is repeated, until each context in the calling chain is tested. The loop of test 769, set 771, and test 773, is thus used to find the highest priority, lowest level context above the raising context for handling the event.

If there are no contexts in the call chain that seize the raised event, then a loop from test 775 to set 779 will traverse down the call chain until a context for handling the event is located. Thus, beginning with context A, the kernel 213 determines 777 if context A is listed for capturing the event. In this example it is not, so context B, the next invoked context in the call chain, is set as the test context. Now it is assumed that context B is indicated to capture the event, and so it will be returned 783. Context B will be selected as the handling context even if context E is also designated for capturing the event, since context B is a lower priority, higher level context.

Returning now to FIG. 7D, the flag for the application of the scope rules may be set to false at step 763 because either the event is being signaled (the flag being set false at step 709) or the kernel determined 719 that there was no active thread of control in the raising context. In either case, the kernel 213 determines the proper handling context by basically following the same semantic steps as before, first attempting to locate the highest priority seizing context, and then attempting to locate the lowest priority capturing context.

Accordingly, the kernel 213 traverses 785 the list of contexts that are indicated to seize the raised event, and determines the context with the highest priority that is less than the priority of the raising context. If such a context is found 787, then the handling context is set 789 to this context, and the identified context is removed 791 from the list of seizing contexts and reinserted after all entries of the same level of priority. The context is then returned 800 to the calling routine as the handling context. If the proper context was not found 787, then the kernel 213 traverses 793 the list of contexts set to capture the raised event and attempts to locate a context having a lowest priority that is less then the priority of the raising context. If such a context is located 795, then this context is set 797 as the handling context, and it is likewise removed 799 from the list of capturing contexts and reinserted at the end of the list after all contexts of the same priority. The handling context is then returned 800 to the calling routine. If an appropriate handling context is not found, then again a null context is returned 781 to the calling routine.

The above event mechanisms differ from extant similarly named mechanisms, in that they provides no information beyond the occurrence of the event. As a result, the higher level context that "captures" the event can perform actions appropriate to the handling of the event.

Capturing and Seizing

The Signal_Event and Raise_Event functions are subject to additional considerations to determine the handling context. These considerations depend on how the event was "captured." The capture of an event is a way of registering with the kernel 213 that a context is to be notified of the occurrence of an event. When the event occurs, by either being signaled or raised, all the capturing contexts are determined, and a counter associated with the event is incremented in the address space of each capturing context.

An event may either be captured or seized. The syntax for capturing an event takes one of the following forms:

Capture( oops );

Seize( oops );

The semantics of event capture involve incrementing a counter in the address space of the capturing context. This increment operation is guaranteed to be atomic. There is a separate counter allocated for an event by each context that captures the event, and the target context for the capture of an event may be resolved by use of the hierarchical scope rules imposed on the context structure. The action subsequently taken by the capturing context depends on whether there is an associated event routine in the capturing context. The execution of this event routine is deferred by the kernel when the capturing context is of lower priority than the context raising the event.

In the preferred embodiments of the invention, the default rule for event capture is to allow the event to be captured at the highest semantic level. For instance, where the kernel is embodied as a part of a host operating system, an application program might be supported by an operating system shell. Program error conditions could be logically expressed as global events. If a DIVISION_BY_ZERO event, defined by the kernel, were to be captured by the application program, the application program could deal with this condition appropriately. If both the application program and the operating system shell were to capture the DIVISION_BY_ZERO event, however, the higher level context (the application) would actually handle the event. If the rules defined in the kernel for event capture can not be resolved between two equal level (same priority) contexts, the kernel will provide a round-robin distribution of the events.

The Seize() method is semantically identical to the Capture() method; however, it overrules the default highest semantic level capture rule. If a O/S shell were to Seize the DIVISION_BY_ZERO event, then event would never be seen by the application. Seize and Capture are both implemented as C++ methods defined for the Context class that invoke the Capture_Event kernel function. A parameter to this function is used to determine whether the event is to be seized, or captured. An Uncapture method is used to suspend the capture of an event.

Figure 8:
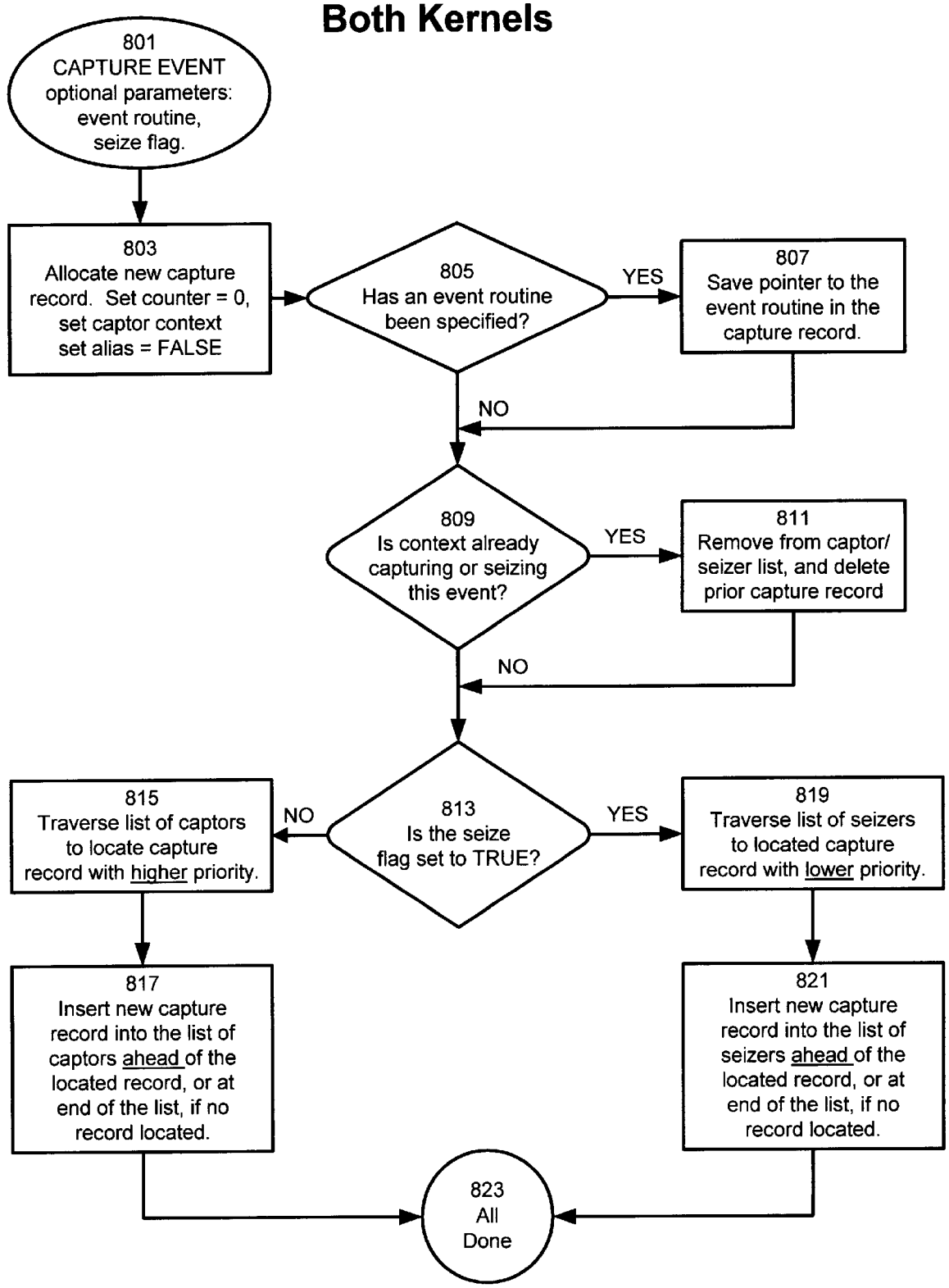
FIG. 8 is flowchart for the Capture_Event routine in both multistack and single stack kernels.

Referring now to FIG. 8, there is shown a flowchart for capturing and seizing events in both preemptive and polling multitasking kernels. A Capture_Event routine is called 801 by one of the contexts of the application 215 indicating that the context is to be notified of condition within another context. Optionally, parameters can be passed to the routine, including a handle to an event routine, and a flag indicating whether context is to seize or capture the event. A new capture record is allocated 803 in the address space of the context, wherein a counter is initialized for the event, and the capturing context is memorized on the stack. The kernel 213 then determines 805 if an event routine has been specified for the event to be captured. If so, then a pointer to the event routine in the capturing context is saved 807 in the capture record. Once the pointer is saved, or if no event routine was specified, then the kernel 213 determines 809 whether the context is already capturing or seizing the event. If it is, then the context is removed 811 from the capturing context's list of captured events, and the prior capture record is deleted. This ensures that there is only one capture record for a given event at a time. In either case, the kernel next determines 813 if the seize flag was set to indicate that the event was being seized. If the event is being seized, then kernel's list of seized events is traversed to identify the highest priority, lowest level context that can capture the event. A new capture record is inserted 821 into the head of the kernel's list of seized events, so that this event obtains the highest priority handling. If the event was not being seized, but rather captured, then the list of capture records is traversed 815 to determine the context with the lowest priority, and the highest level that can handle the event, and again, a new capture record is inserted 817 at the head of the capture record list. This allows the lowest priority context to handle the event. Once the event is either captured or seized, control is returned 823 to the kernel 213.

Figure 9:
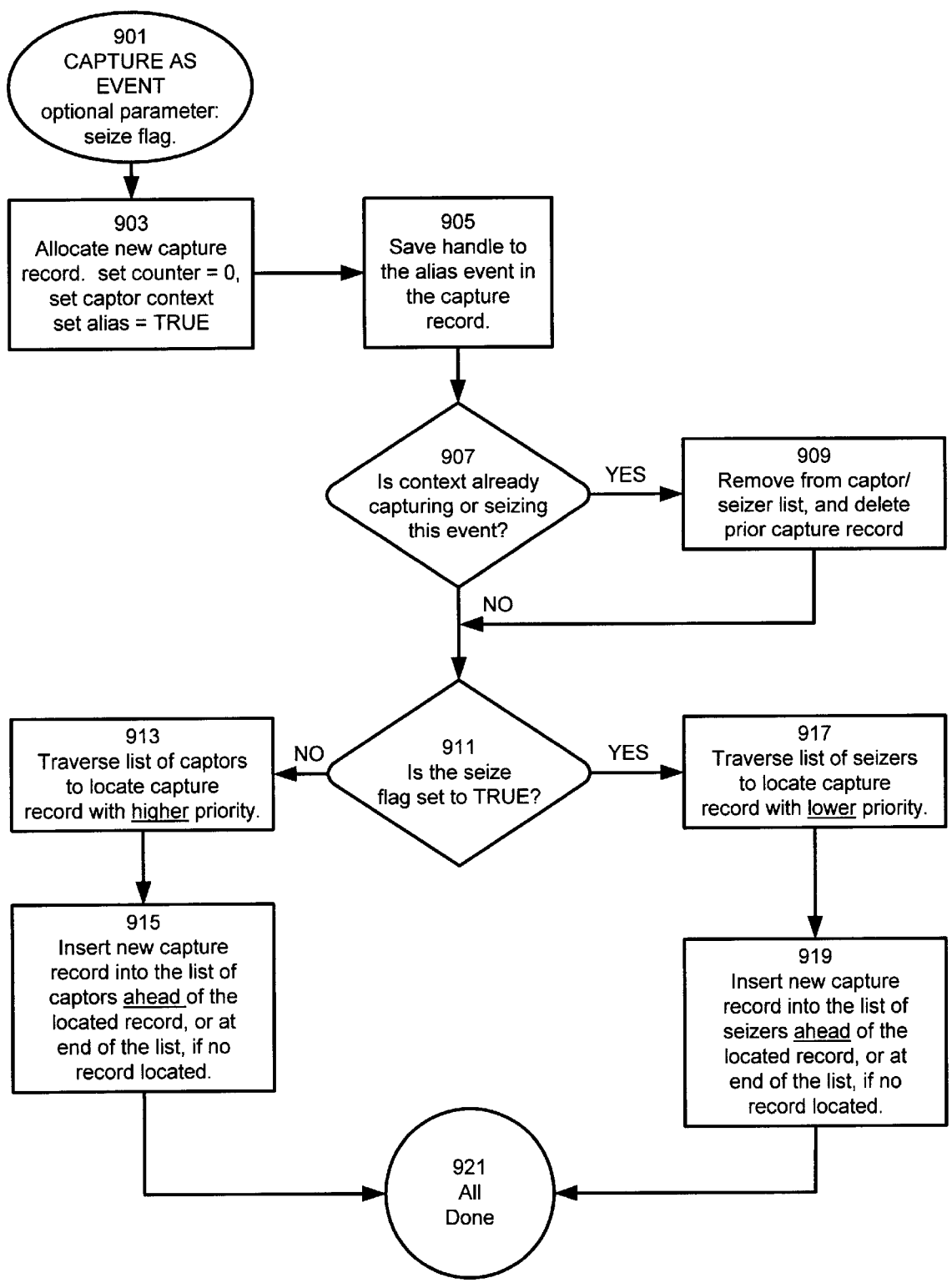
FIG. 9 is a flowchart for the Capture$_{13}$ As_Event routine both multistack and single stack kernels.

FIG. 9 shows a flowchart for a Capture_As_Event routine. The routine is basically the same as the Capture_Event routine, except that instead of determining 805 if an event routine has been passed as a parameter, and then saving 807 a pointer to this event, a handle to the alias event is saved 905 in the capture record. The routine then continues in the same manner as the Capture_Event routine.

Figure 10:
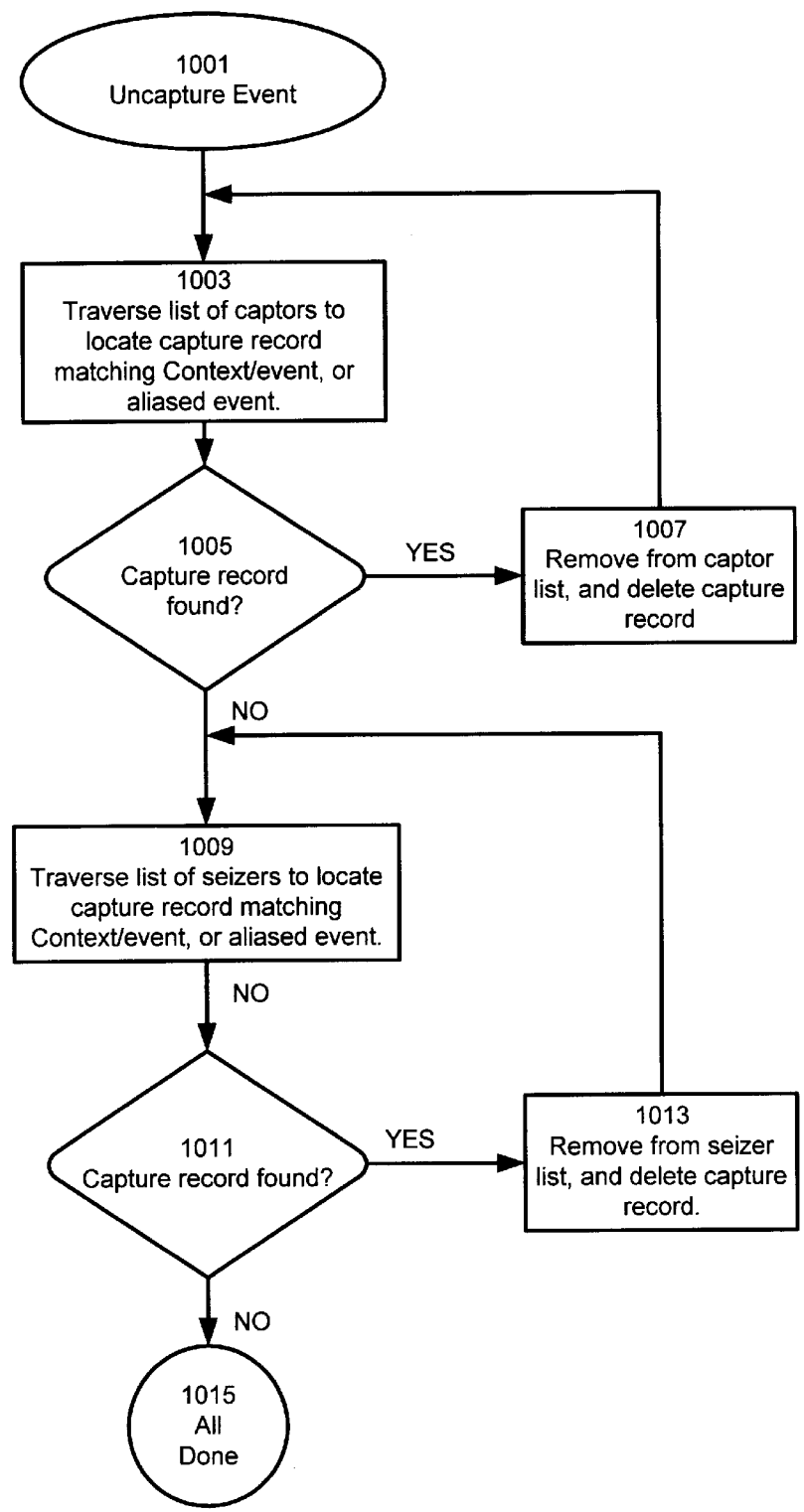
FIG. 10 is a flowchart for the Uncapture_Event routine in both multistack and single stack kernels.

The code preprocessor 227 supports the capture of several different events as a single event that is defined within the scope of the local context. For instance, suppose there are three variables, x, y, and z that define an attention event; these events may be captured and treated as a common event as follows:

Capture(x.attention, y.attention, z.attention, Attention);

Assuming that Attention is an event defined local to the capturing context, the subsequent C++ code is produced by the preprocessor:

Capture(Attention);

Capture_As_Event(x.attention, Attention);

Capture_As_Event(y.attention, Attention);

Capture_As_Event(z.attention, Attention);

The kernel 213 also provides for uncapturing of events in order to return the thread of control to the calling context by suspending the capture of an event. FIG. 10 shows flowchart for the Uncapture_Event routine. The kernel 213 first invokes 1001 the uncapture event routine; the capture records for capturing contexts are traversed 1003 to locate the capture record that contains the context and event that was most recently handled, or the alias of the event. If the capture record is found 1005, then it is deleted 1007 and the context is removed from capturing context list. Otherwise, the list of seizing context is traversed 1009 to locate the capture record that matches the context and event. If found 1011, that context is removed 1013 from the seizing context list, and the capture record deleted. Control is then return 1015 to the kernel 213.

Handling Events

Figure 13:
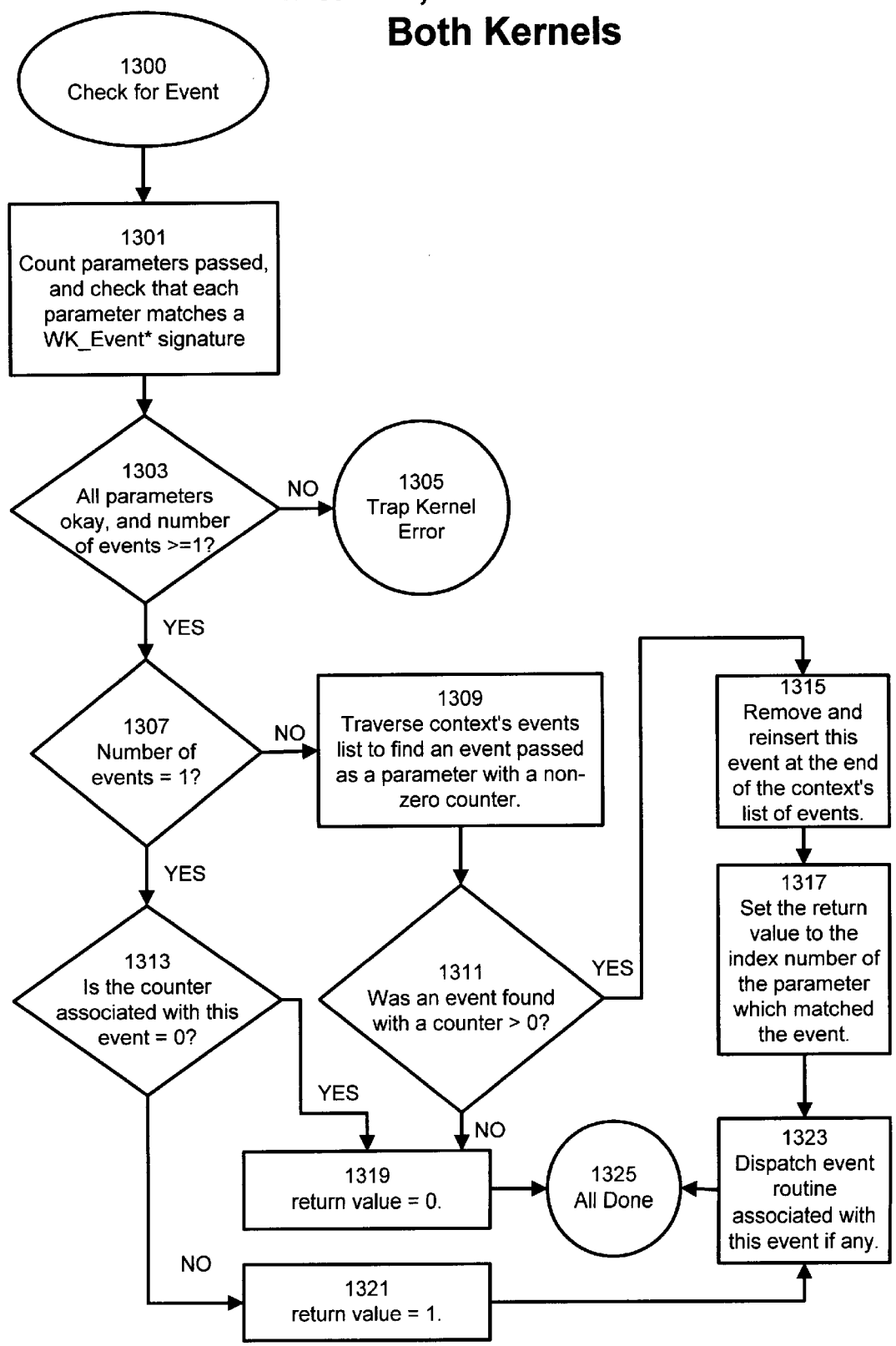
FIG. 13 is a flowchart for the internal Check_Event routine for the kernel of the present invention.

Events that are captured by a context may handled in a number of different ways. In addition to signaling or capturing a event, a context may also wait for an check for events. First, a context may "check" if an event has occurred (and been captured). FIG. 11B shows a flowchart for checking an event. The context invokes 1113 a check routine by the kernel 213. The kernel 213 executes 1115 an internal check routine, the flowchart of which is shown in FIG. 13, to determine the status of any number of events, using as parameters pointers to the desired events. The kernel 213 then returns 1117 a value indicating the status of the check for the events.

The internal check routine is shown in FIG. 13. Here, the kernel 213 counts 1301 the number of events passed to it, confirming that each has the appropriate kernel event signature. The kernel determines 1303 if all of the parameters are satisfactory and the number of events is greater than zero. If either of these conditions is false, the kernel returns 1305 an error. Otherwise, the kernel 213 determines if the number of events passed to equals one. If so, a test determines 1313 if the counter associated with the event is set to zero, returning 1319 that value if it is. If the counter is set to one, that value is returned 1321, and event routine associated with the event parameter is dispatched 1323, whereon control is returned to the kernel. If the number of events was greater than one at step 1307, then the event list for the calling context is traversed 1309 to find an event that was passed to the kernel with a non-zero counter. If such an event is found 1311, that event is removed 1315 from the head of the list of events and placed at the end. The return value is set 1317 to the index number for the parameter, and the event routine for the event is executed 1323.

The check event routine is invoked by using the check clause:

```
if ( Check( oops ) )
{
    ...
}
```

In the preceding pseudo code example, the check clause will return 0 if an occurrence of the oops event has not been captured. If it returns non-zero, the counter associated with the capture of the event will be decremented. The check clause may also be used in the programming environment supported by the code preprocessor 227 to test for multiple events in the following manner:

```
Check
{
    case (oops)
        x = 1;
        break;
    case (x.attention):
        y = 2;
        break;
    default:
        z = 3;
        break;
}
```

This syntax resembles the syntax of the switch statement used in C++ and C. Unlike the switch statement, a case may be composed of expressions which evaluate to an event type (e.g. x. attention). This is possible because the code preprocessor 227 will generate the following C++ code after processing the check clause.

```
{
    int case_var;
    case_var = Check_Event( 2, oops, x.attention );
    switch (case_var)
    {
        case 1:
            x = 1;
            break;
        case 2:
            y = 2;
            break;
        case 0:
            z = 3;
            break;
    }
}
```

This case use of the check clause will also decrement the counter associated with the event that is returned from the Check_Event routine. The case use of the check clause may be contrasted with the following programming example.

```
if ( Check( oops ) )
{
    x = 1;
}
else if ( Check( x.attention ) )
{
    y = 2;
}
else
{
    z = 3;
}
```

The effect of the case clause may appear to be the same as in the preceding code example. However, the Check_Event kernel function is guaranteed to provide round-robin selection between multiple outstanding events. In contrast, the preceding code example will always give precedence to checking for the occurrence of the oops event over the x.attention event, and thus is inappropriate for use in testing for multiple asynchronous events.

Checking for an event is not the only way a context has to handle an event occurrence. The wait clause is semantically similar to the check clause, and will generate a call to the Wait_Event kernel routine. FIG. 11A shows a flowchart for the Wait_Event routine. The only difference between the Wait_Event routine and the Check_Event routine is that if the kernel 213 determines that event passed to the Wait_Event routine has not occurred 1105 (the return value is zero) Wait_Event routine will block 1107 the context from further execution until the specified event(s) has occurred. The consequence of blocking the execution of the context depends on the type of the kernel implementation, and is further explained below with respect to the differences between a single-stack and a multi-stack implementation of the kernel of the present invention.

Figures 12A, 12B:
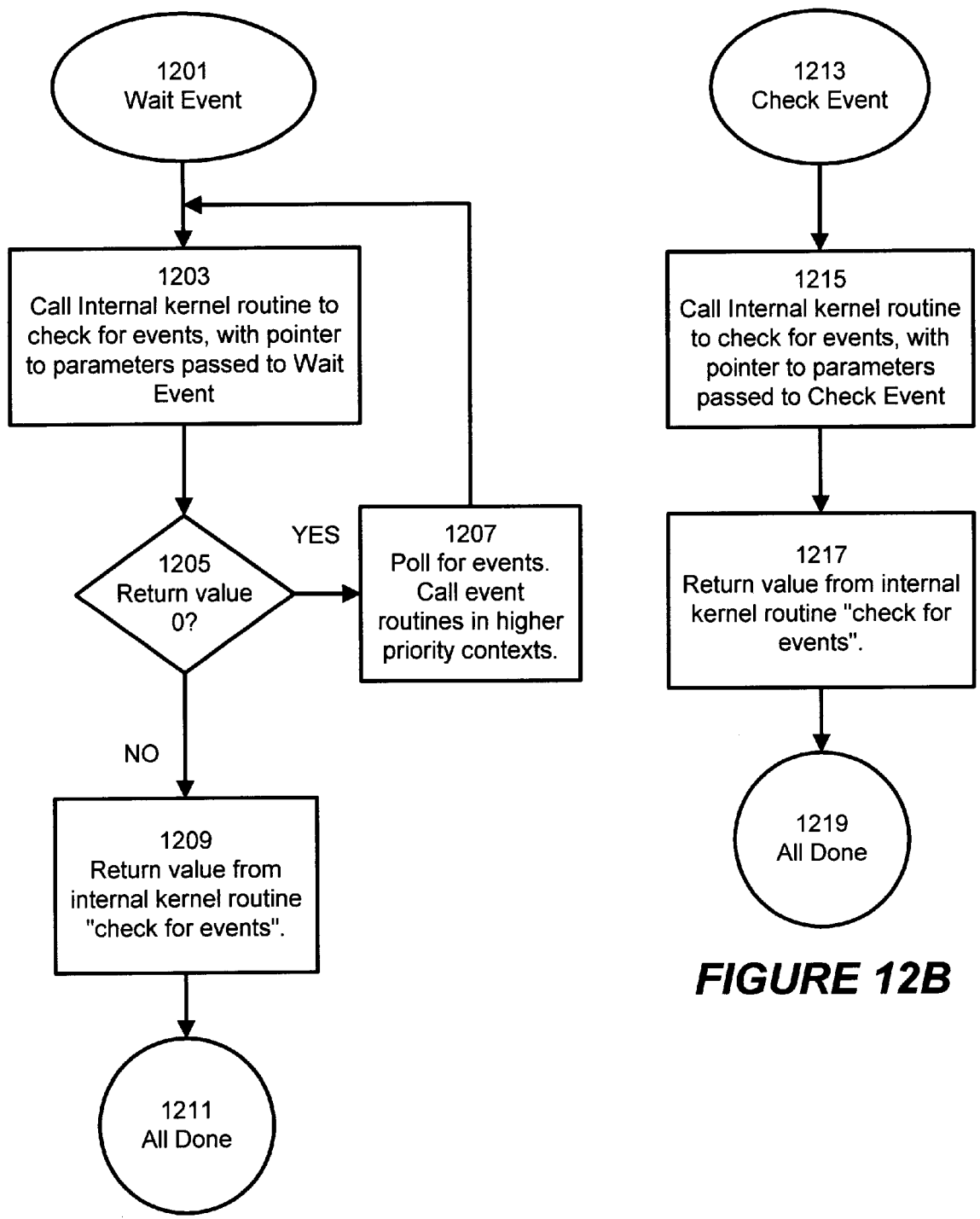
FIGS. 12A and 12B are flowcharts for the Wait_Event and Check_Event routines in a polling single stack environment.

FIGS. 12A and 12B show the implementation of the Wait_Event and Check_Event routines in a polling single stack environment. The Check_Event routine is functionally the same; the Wait_Event routine polls 1207 for events, and calls events routines in higher priority contexts when the waited for event has not been captured 1205.

Event Routines, Preemptive & Prioritized Code Execution

Events defined within the scope of a context may have an associated event routine. The event routine provides the means for preemptive and prioritized execution of code using the kernel of the present invention, and thereby allowing real-time handling of asynchronous events required in a pre-emptive multitasking environment. The declaration of an event routine is illustrated in pseudo code as follows:

```
Context Device
{
    int alert_counter;
    Event       Alert
    {
        ++alert_counter;
        if (alert_cdunter > MAX_ALERTS)
            Do_Something();
    };
    .
    .
    .
};
```

Prioritized execution of the event routine is based on the priority level of the context in which the routine is defined. All contexts have a execution priority associated with them, and all invocations must be from lower priority contexts to higher priority contexts. When an event is captured by a context with a higher priority than the currently executing context, the kernel 213 may preempt the execution of the lower priority context, to execute the event routine defined for the context.

The execution of an event routine may be synchronous, or asynchronous. The asynchronous execution of the event routine occurs when there is no active thread of control within the scope of the context, and the routine is dispatched for execution by the kernel. In a multistack environments, this dispatch process may involve selecting a task, (a separate thread of control) to execute the event routine. In a single stack environment the kernel may simple call the routine. If there is an active thread of control within the context, the execution of the event routine will be delayed until either a Wait or Check clause is reached, or the currently active thread exits the scope of the context.

The synchronous execution of an event routine occurs when the active thread within the context explicitly performs a Check or Wait clause for the event. In this case, in addition to the previously discussed semantics of the clauses, the associated event routine is executed prior to returning from the Check or Wait clause. This execution of the event routine may occur within the current thread of control for the context (i.e. synchronously).

Event routines must be parameterless and have no (void) return value. Although the kernel 213 allows the specification of an arbitrary function pointer as a parameter to the Capture_Event function, it is the intent of the programming methodology supported by the kernel 213 to enforce a language level association between the declaration of the Event, and the routine to be executed. For this reason, the code preprocessor 227 supports the automatic assignment of the appropriate routine when an event that has been declared with an event routine is captured. Occasionally, it might be desirable to execute an event routine when an event occurs that is defined in another context. Although it is possible to assign an arbitrary routine to the capture of this externally declared event, the preferred process is to declare a new event, local to the capturing context, with an associated routine, and capture the external event as this newly defined event. This is illustrated in the following pseudo code example.

```
Event Attention
{
    <routine statements>
    .
    .
    .
    Capture(x.oops, Attention);
}
```

Figure 14A:
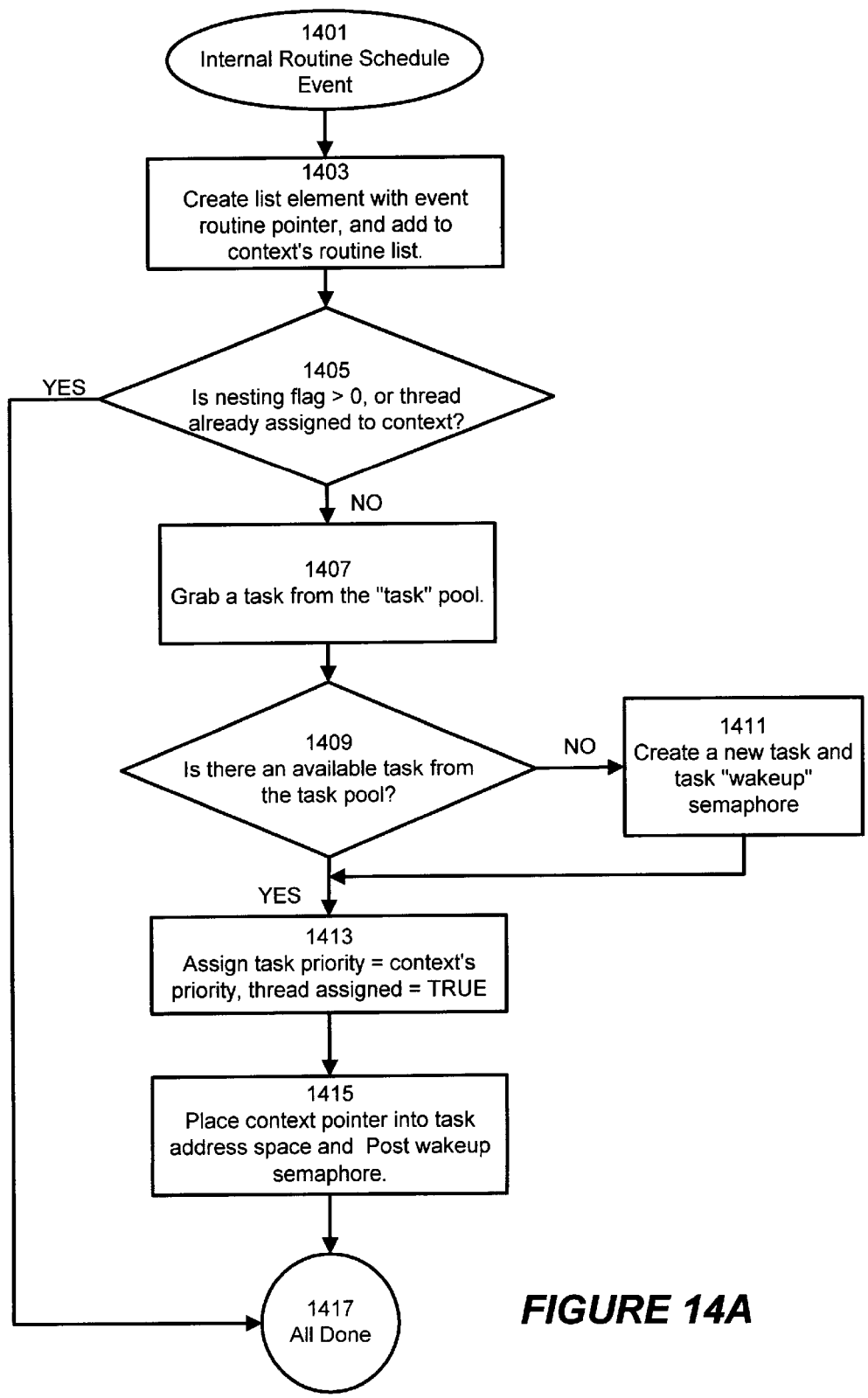
FIGS. 14A and 14B are flowcharts for the Schedule_Event routines in both multistack and single stack kernels.

Exemplary embodiments of the event mechanisms generally described above are shown in the flowcharts of FIGS. 14 through 16. Referring now to FIG. 14A there is shown a flowchart for one embodiment of a routine for scheduling events in a preemptive multistack kernel 213 according to the present invention. The Schedule_Event routine is called 753 from the internal raise event routine after a context for handling an event has been located by the kernel 213. Once called, the kernel 213 then adds 1403 to the context's routine list an element for the event routine being scheduled, including a pointer to the event routine. To provide for the asynchronous execution of the event routine by a context, there cannot be an active thread of control in a context when the event routine is to be executed. Accordingly, the kernel 213 determines 1405 whether the nesting flag of the context is greater than zero, or whether an active thread of control is already assigned to the context. In either case, the Schedule_Event routine returns control to the internal raise event routine, the event having been added to the end of the schedule list. Otherwise, if the context is not currently active, then the kernel 213 selects 1407 a task from the task pool, and determines 1409 if there is an available, non-null, task. If a task is available, it is assigned 1413 a task priority equal to the execution priority of the context that is handling the event, and the context is assigned an active thread of control. This assignment of the execution priority of the context to the task provides the mechanism for prioritized handling of the tasks according to the priority of the handling context. Accordingly, when a low level, high priority context is designated for handling an event, the kernel will use the priority of that context to preempt the execution of tasks having a lower execution priority, i.e. tasks that are captured by higher level contexts. A pointer to the context is stored in the address space of the task, and a wakeup semaphore is posted 1415 for the task.

Figure 14B:
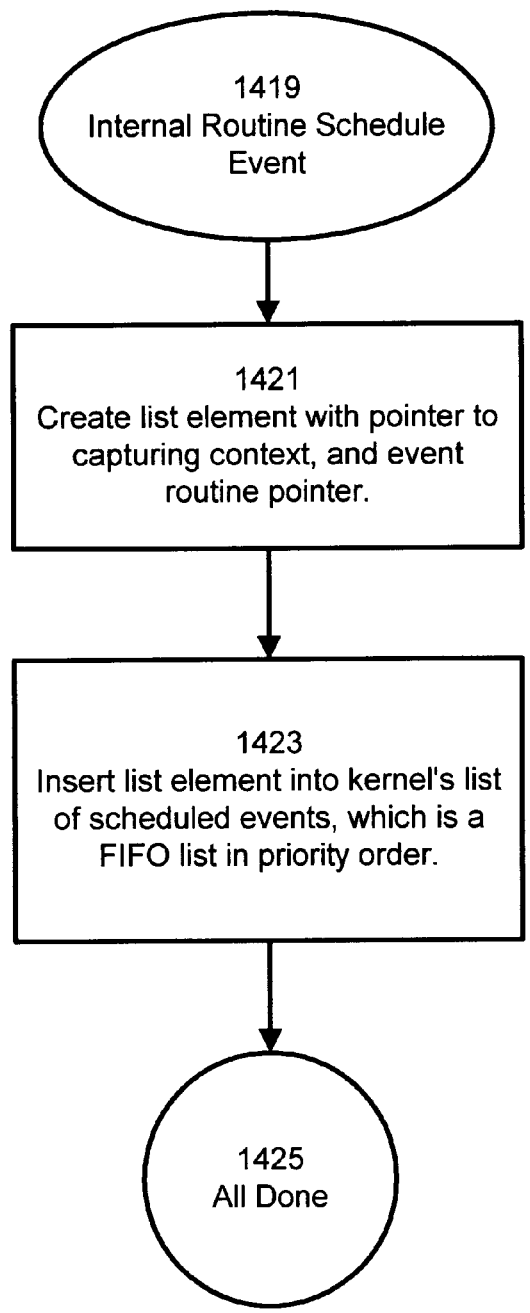

FIG. 14B shows an embodiment of the Schedule_Event routine in a polling embodiment. Here the single stock kernel 213 need only create 1421 the list element with a pointer to the capturing context, and place 1423 that element in the kernel's list of scheduled events, which are then processed on a first in, first out basis according to the priority of the handling context.

Figure 15A:
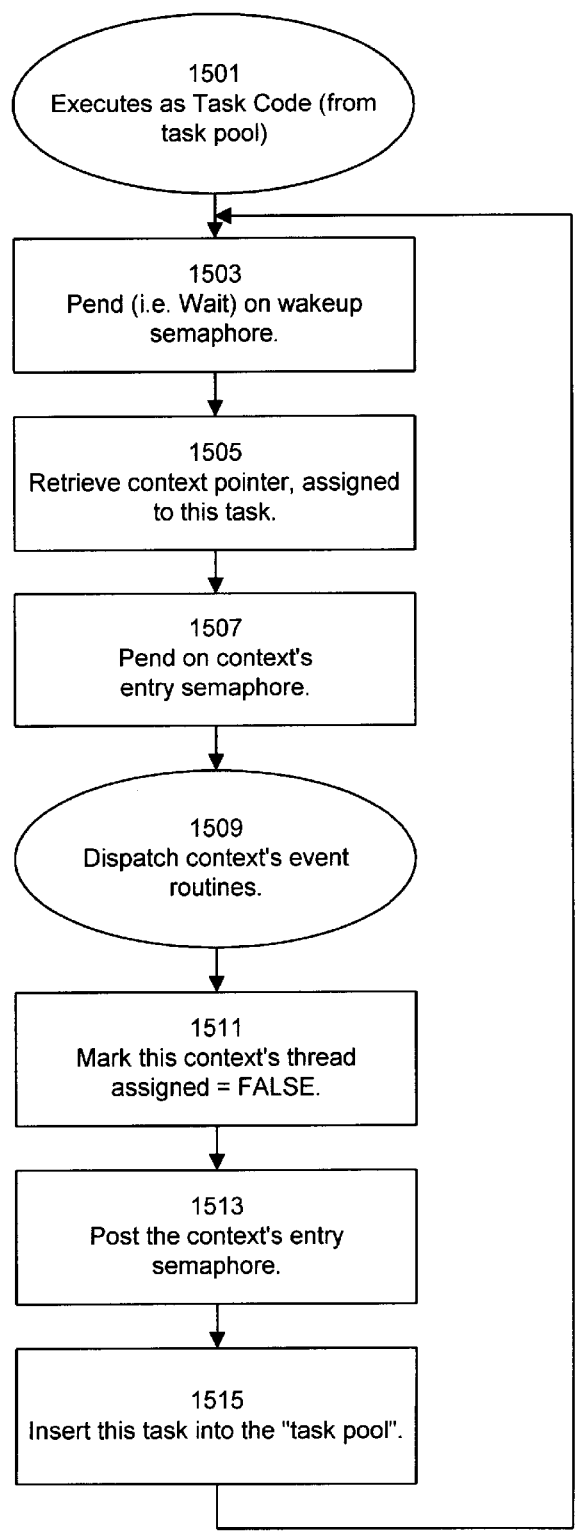
FIGS. 15A and 15B are flowcharts for the Task_to_Dispatch_Events and Polling-to-Dispatch_Event routines for both preemptive and polling kernels.

FIG. 15A shows a flowchart for one embodiment of a routine 1501 for executing the event routines handled by a context, while ensuring the priority of execution. In the preferred embodiment, the event routines are executed by a task. This task is implemented by a conventional preemptive, prioritized, multitasking environment. The task waits 1503 for the wakeup semaphore that was posted 1415 for the task. When the semaphore is posted, the pointer to the executing context is retrieved 1505. The routine then waits 1507 for the entry semaphore. This semaphore is posted 423 when the context has completed an invocation. By waiting for this semaphore, the routine ensures that a context is not invoked for executing an event routine while outstanding event routines are being handled. Once the entry semaphore is posted 423, indicating that the context has completed execution, then a routine for dispatching the scheduled event routines is called 1509; one such routine is illustrated in FIG. 15C. Once all the events routines for a context are dispatched, then the context's thread of control is set 1511 to inactive, and the context entry semaphore is posted 1513. This indicates the context is being called to execute an event routine. The task is then returned 1515 to the task pool.

FIG. 15C shows a flowchart for one embodiment of a Dispatch_All_Events routine 1535 for ensuring that all event routines that are outstanding for a context are dispatched prior to the asynchronous execution of a newly scheduled event routine. In this embodiment, the routine retrieves 1537 the pointer to the event routine from the context's routine list, and removes the element from the list. The kernel 213 then determines 1539 if the context's routine list is empty, and if so, all the routines scheduled for the context have been handled, and the routine returns 1541. If there remain event routines on the context's routine list, then the event routine that was retrieved is dispatched 1543 by calling a dispatch event routine. Once the routine is executed 1543 it will return a value indicating the number of times the event routine has been scheduled for execution that remain to be completed. If this counter is zero (step 1545) then the routine is deleted from the context's routine list. Otherwise, it is reinserted 1549 at the end of the routine list, to be retrieved 1537 and dispatched 1543 again. This loop repeated until the event routine has completed all of the executions for which it is scheduled.

Figure 16:
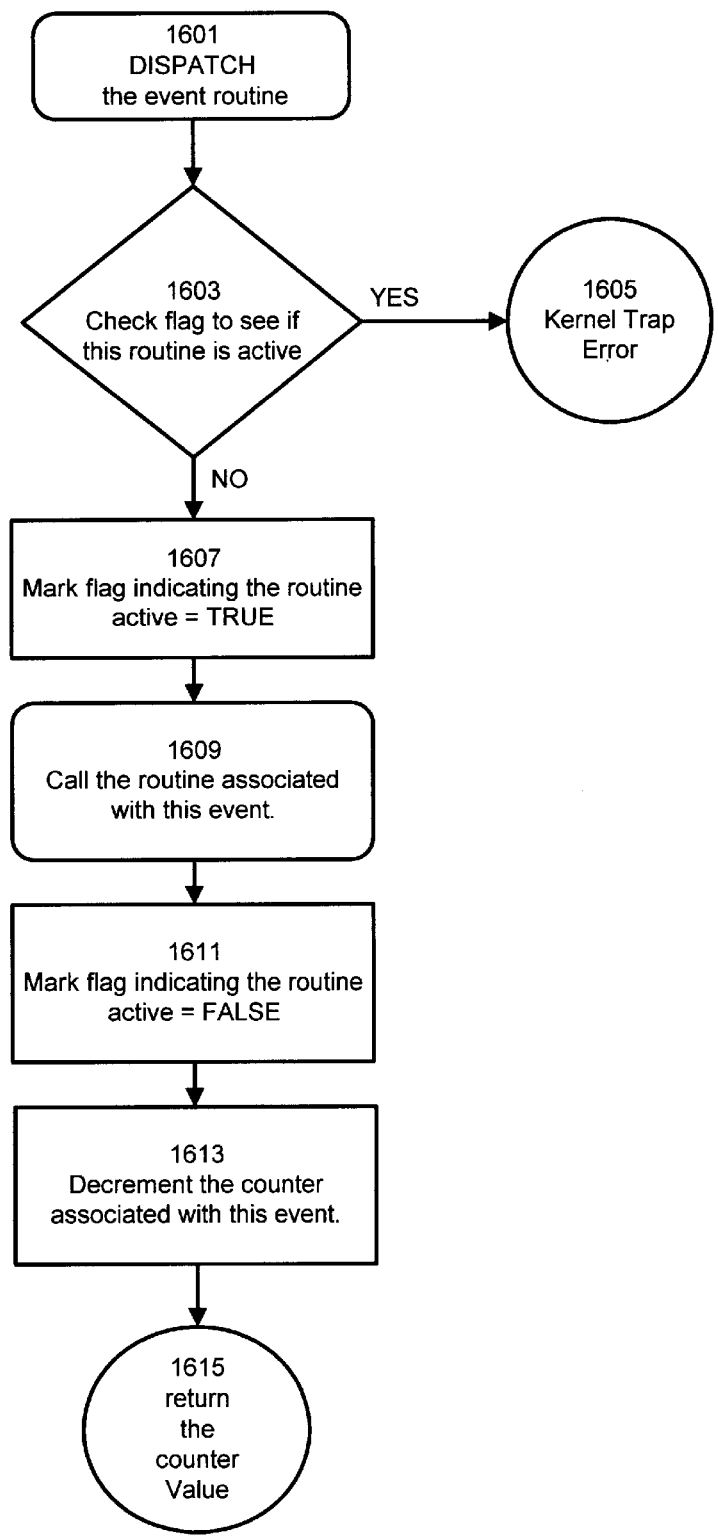
FIG. 16 is a flowchart for the Dispatch_Event routine for both the preemptive and multistack kernels.

FIG. 16 shows one embodiment of a Dispatch_Event routine 1601 for dispatching event routines, as called 1543 by the Dispatch_All_Events routine 1535, and by the Exit_Context routine 417. When called, the routine determines 1603 whether a flag for the routine indicates that it is currently active. If so, then the kernel 213 traps 1605 the error. Otherwise, the kernel 213 sets 1607 the flag to indicate that the routine is currently active. The event routine is called 1609 using the pointer to the event routine, and executed. When execution is completed, the flag is reset 1611 to indicate that the routine is no longer active. These steps of checking the thread of control flag before execution and then setting and resetting the flag prevent unbounded recursion by blocking an event routine from calling itself, either directly or indirectly. The use of the flag also prevent non-reentrant code by ensuring only a single thread of control in a context at any give time. After resetting the flag, the counter for event routine is decremented 1613, indicating that one of the execution cycles for the event is completed. This counter value is then returned 1615 to the calling routine, which as described above, will cause another execution cycle by retrieving 1537 the pointer to the event routine and redispatching 1543 the event routine.

Figure 15B:
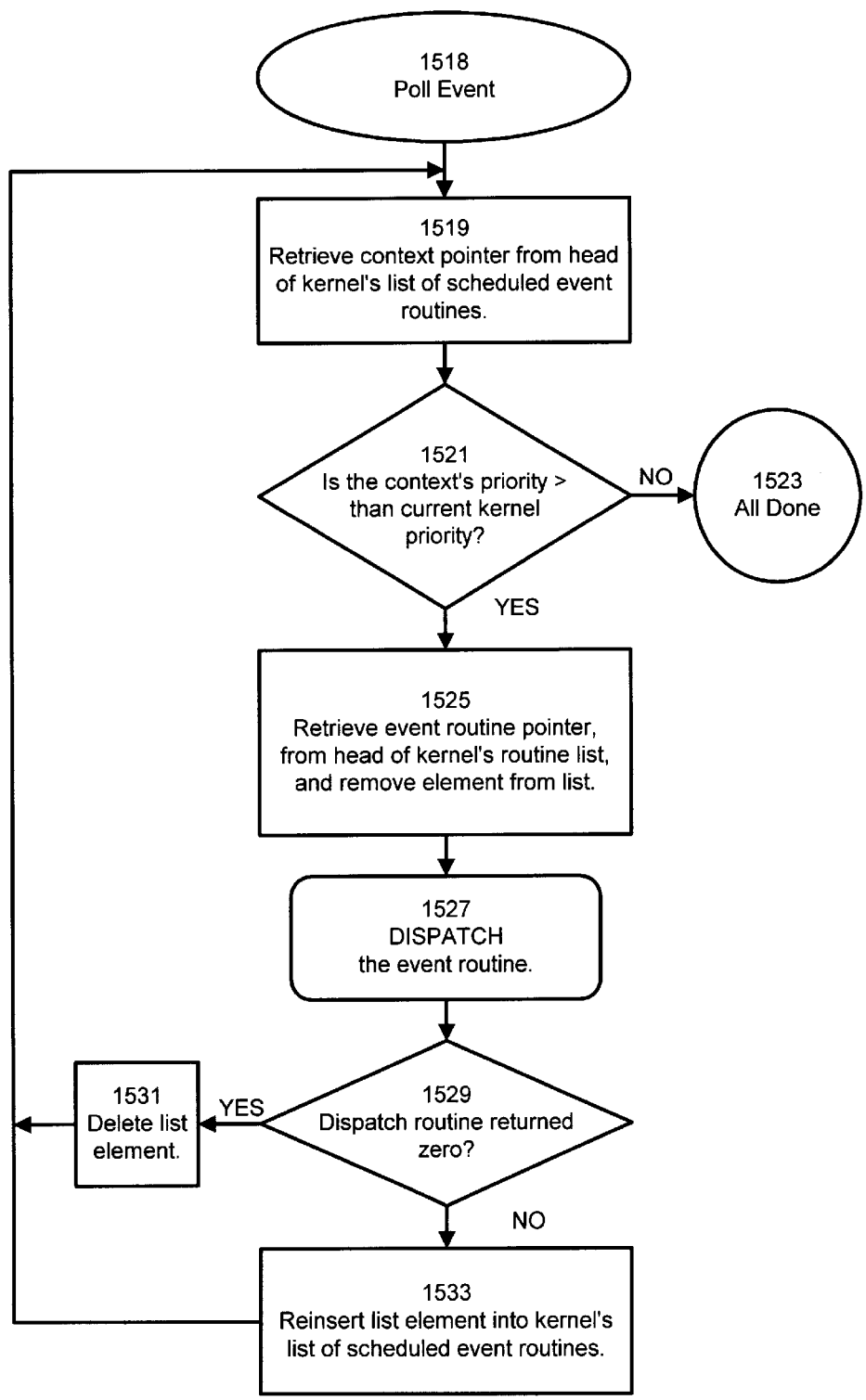
Figure 15C:
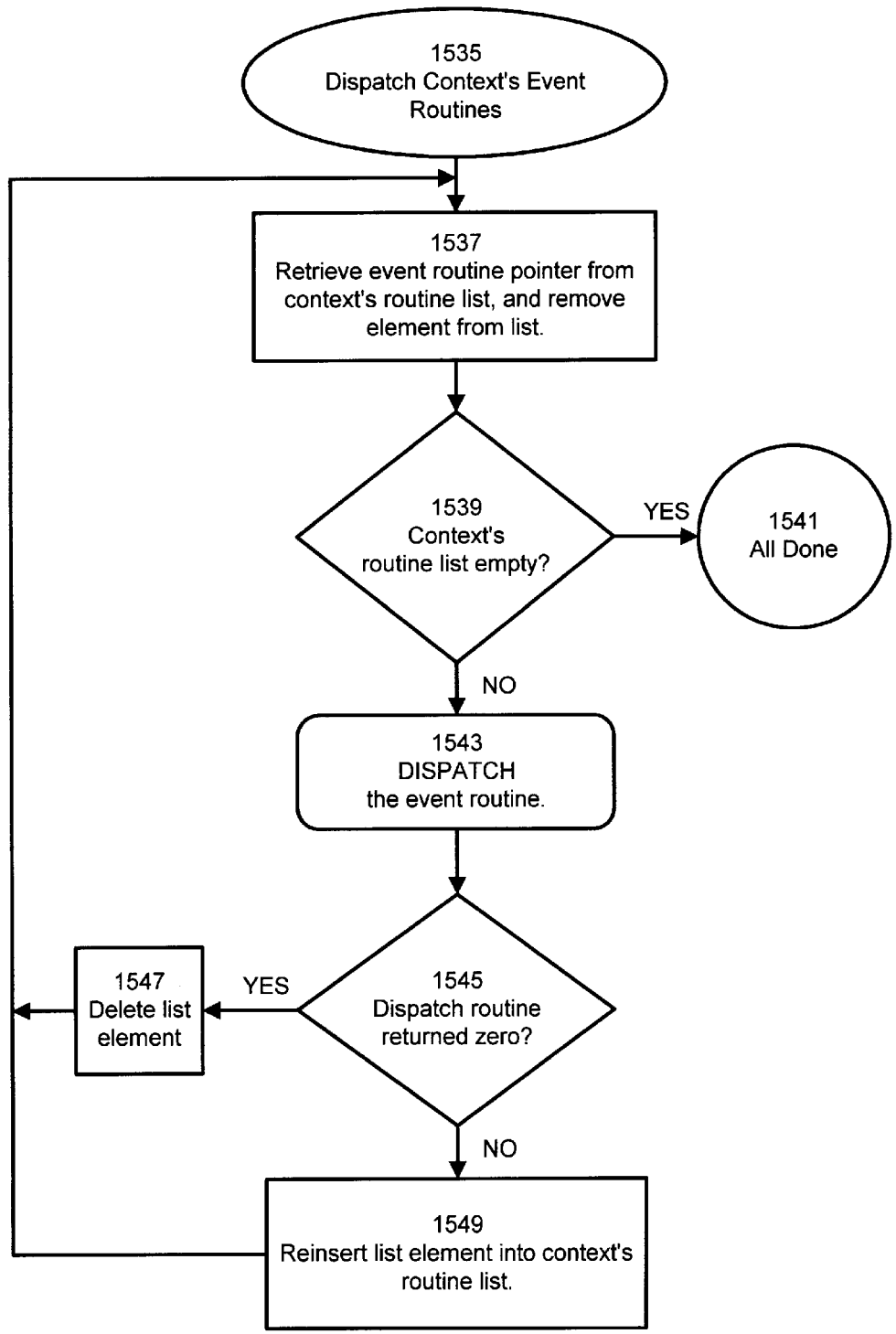
FIG. 15C is a flowchart for the Dispatch_All_Events routine for the preemptive multistack kernel.

FIG. 15B shows a flowchart for an embodiment of the Dispatch_Event routine in a polling, single stack environment. This routine is called in the polling embodiment when it is necessary to poll for events and execute them on a priority basis. FIGS. 5A, 5B, and 12A show the routines that would call the polling Dispatch-Event routine 1518.

Multistack versus Single Stack Kernels

As has been mentioned in the foregoing, the present invention may be embodied in either single-stack or multi-stack environments. The prioritized event handling provided by the kernel 213 allows both environments to be used for the development of real-time applications. A multi-stack kernel provides the advantage of allowing code to wait for the occurrence of events, without the undesirable blocking of other units of code.

Figure 17:
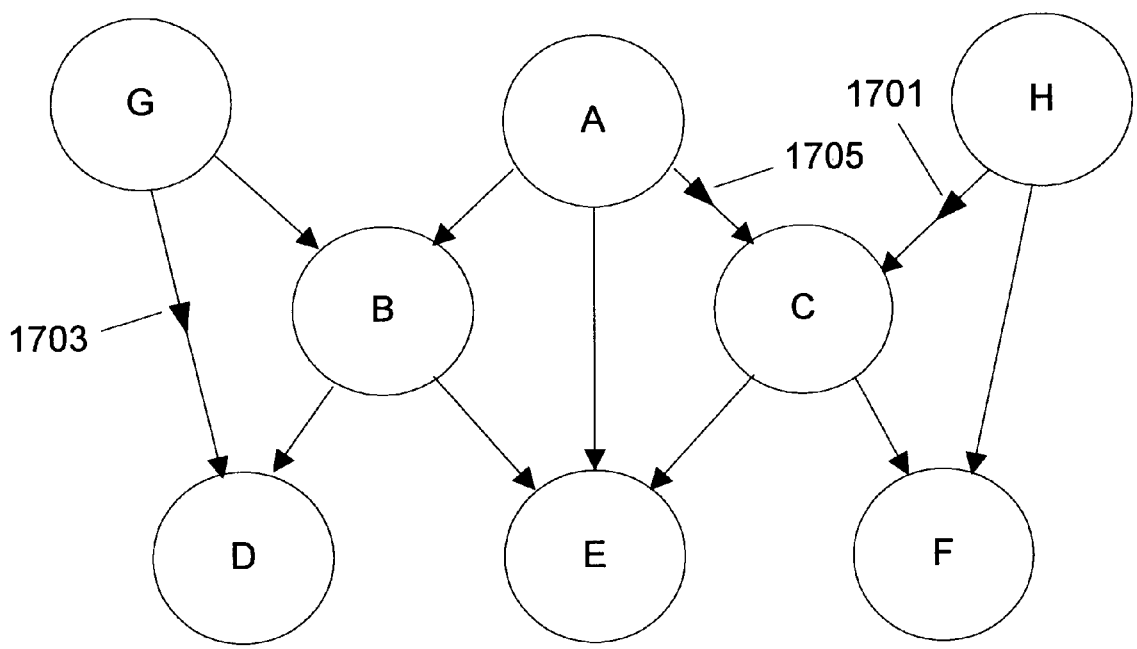
FIG. 17 is an illustrations of an invocation structure of an application.

FIG. 17 shows the invocation structure for a software application used in a multistack environment. In this example, assume that context H has made a call 1701 to a service provided by context C. Further suppose that this service waits for the occurrence of an event prior to returning to the calling context. Now suppose an asynchronous event is captured by context G, which makes a service call 1703 to context D. This sequence of code execution may be allowed to execute even though context C is still waiting for an event to occur. The multi-stack implementation of the kernel allows this type of concurrency. However, if context A were to capture an asynchronous event, and make a service call 1705 to context C, it would be blocked by the Enter_Context mechanism since there is already an active thread of control in context C arising from context H. Thus, the multi-stack embodiment of the kernel checks to ensure that there is no thread of control within a called context, in addition to ensuring that the called context is of higher priority than that of the caller.

The kernel 213 may also be embodied in a single stack implementation. Using the software application and invocation structure of FIG. 17, if context H calls 1701 context C, and context C waits for an event to occur, only event routines in higher priority contexts than context C would be allowed to execute during this waiting period. Thus, if an asynchronous event were captured in context A while context C was still waiting for an event, context A would be blocked until the completion of the thread of execution from context H to context C. The single stack embodiment of the kernel would still be able to dispatch event routines associated with contexts D, E, and F, while waiting for an event in context C. In addition, the single stack embodiment of the kernel need not check to see if there is an active thread of control within a called context. Merely checking that the called context is of higher priority than the calling context is sufficient to ensure this condition.

Both versions of the kernel 213 provide certain guarantees about the code structure. The single thread of control per context condition is maintained. Thus, code reentrancy is eliminated, and there are no critical sections visible to the programmer. Since context invocations are purely hierarchical, there can be no inter-context recursion (intra-context recursion is allowed). Both types of kernels restrict the use of the Wait statement within event routines to ensure a cyclic nesting of Wait conditions does not occur within the scope of a context. Since inter-context waiting is guaranteed to be hierarchical, the cycle of wait-for conditions is prohibited, and the deadlock condition can not occur.

Although the multi-stack version of the kernel 213 may be viewed as superior to the single stack version, both types of kernels have their uses. The single stack kernel integrates better with existing code that does not support multi-stack operation. Code components may be written in a state-driven manner to avoid undesirable blocking. In some instances, the application supported may not require several peer level code entities, and the preemptability provided within the single-stack environment may be all that is needed of the application. This may be particularly true in embedded systems, where the single stack kernel may be used on component boards having small address spaces. The reduced system requirements for the single stack kernel may make it the most desirable kernel in such cases.

Although the single-stack/multi-stack differentiation is the greatest distinction between kernel implementations, other variations exist. Distributed kernels may provide Event_Handle implementations that span disjoint address spaces. Multiprocessor kernels may coordinate multiple CPUs to execute various contexts truly concurrently. These various implementations are considered to be within the scope of the invention disclosed herein.

Preemptive Versus Polled Kernels

The embodiments of kernel of the present invention may also be subdivided into polling kernels and preemptive kernels. When an event is captured by a context, an event routine may be scheduled for execution. If the priority of the capturing context is higher than that of the currently executing context, the kernel may preemptively execute the event routine. The multi-stack kernel described above is an example of a preemptive kernel.

FIGS. 5A and 5B show the Enter_Context and Exit_Context routines in a polling kernel. A polling kernel implementation of the present invention would actually defer the execution of the event routine until a Poll_Event kernel function 505 is performed, as illustrated in FIG. 15B. This event must occur prior to the next context invocation. For this reason, the Poll_Event function is invoked 505 within the Enter_Context operation 501 of the single stack kernel 213. This requirement keeps the polling kernel implementation of the kernel semantically the same as the preemptive kernel, with the single exception that there is an increased latency delay between the occurrence of an event, and the execution of the event routine associated with the event. In addition, in the polling implementation of the kernel 213, the application 215 must ensure that the Poll_Event kernel mechanism is invoked periodically whenever the system is idle, or engaged in a loop of repeated instructions for which event handling should be enabled.

The advantage that the polling kernel provides over the preemptive implementation is that it may be incorporated into traditional programming environments without any special operating system support.

With respect to the distinction between polling and preemptive kernels, other embodiments within the scope of the present invention include a multi-stack polling kernel, and a single-stack preemptive kernel, the construction of which is based on the foregoing description and processes.

Hardware Implementations of the Kernel Mechanisms

Hardware architecture is concerned with the tradeoffs involved in the design of a computer. One aspect of this design is the definition of the computer's instruction set. An instruction set provides the low level view of a computer's processing capabilities. It is generally recognized that there is a tradeoff between keeping the instruction set simple, e.g. reduced instruction set computers (RISC), and providing more powerful mechanisms which complicate the instruction set (CISC).

All of the mechanisms provided by the kernel of the present invention can be implemented within the instruction set of a computer. In particular, the Enter_Context and Exit_Context kernel functions that must be performed on every entry/exit of a context, may be appropriately incorporated into an instruction set to ensure their operation and increase the system performance. Since the routines to support these operations depend on the type of kernel provided (single stack/multi stack) it is not necessary that the entire operation be integrated into a single machine instruction. Instead, simply incorporating a current context pointer, and supporting an automatic priority check and change on context entry/exit would provide instruction level support for both environments. The exit context routine could be enhanced within an instruction set by replacing the traditional return from procedure call instruction with an instruction that would trap to the run-time system, to test for the dispatching of events.

In addition to enter/exit context support in the instruction set, the entire event mechanism may be included within a processor's 201 instruction set. The direct support of the event mechanism within the instruction set would obviate the need for existing interrupt service routines (ISRs) which are supported in the instruction set of most computers.

Memory Visibility

One further aspect of the invention is the support of a method for controlling memory visibility between contexts. The various embodiments described herein provide no restriction of memory visibility between contexts. However, the programming methodology employed with the present invention is sufficient to support a context visibility requirement wherein higher priority contexts have the right to change the address space of lower priority contexts, but not vice versa. The preferred embodiment of the kernel 213, in which the Event and Context mechanism are supported in the instruction set of the processor 201, would enforce these visibility requirements. The context hierarchy is used to define the memory visibility implicitly, rather than by the programmer specifying visibility explicitly. Because the memory protection is supported directly by the processor 201, the software programmer is freed from having to specify the memory protection requirement directly, again increasing the reliability and performance of the application 215.

I claim:

1. A method, implemented in a kernel, for enforcing a hierarchical invocation structure between a plurality of contexts, each context having an execution priority determined by the invocation structure of the contexts, wherein there are provided lower execution priority contexts and higher execution priority contexts, the method comprising the steps of:

indicating invocation of an invoked context by an invoking context, determining the execution priority of the invoking context;

the kernel permitting the invocation if the execution priority of the invoked context is higher than the execution priority of the invoking context; and the kernel prohibiting the invocation if the execution priority of the invoked context is less than the execution priority of the invoking context.

2. The method of claim 1 wherein higher priority contexts signal events to lower priority contexts, the method comprising the steps of:

defining an event;

specifying capture of a defined event by at least one context;

specifying a means for the signaling of an event;

determining priority for the capture of an event based on the priority of the invocation structure; and incrementing a counter in the address space of the capturing context.

3. The method of claim 2, wherein the execution of contexts is preempted based on the occurrence of events, the method comprising the steps of:

defining an event routine;

binding the event routine to the capture of an event by the context;

scheduling the event routine upon the capture of the event by the context; and executing the event routine based on the priority level of the capturing context.

4. The method of claim 3, wherein implicit concurrency between contexts is generated, the method comprising the steps of:

determining an event routine scheduled for execution;

determining whether an active thread exists within the context for which the event routine is defined; and deferring the execution if the context is active.

5. The method of claim 4 further comprising the steps of:

responsive to determining no active thread existing within the context:

creating a thread for the execution of the event routine;

prioritizing the execution level of the thread equal to that of the capturing context; and providing for the disposal of the thread upon completion of the event routine.

6. The method of claim 5, wherein the concurrent execution of code within a context is prohibited, the method comprising the steps of:

determining an invoking context and a context to be invoked;

determining whether an active thread exists within the context to be invoked;

allowing the invocation, responsive to no active thread existing in the to-be-invoked context; and responsive to an active thread existing in the to-be-invoked context:

enqueuing the invocation in queue in the presence of an active thread;

determining when a thread completes execution of a context;

determining whether there are any pending invocation requests for the context;

removing a pending invocation request from the head of the queue; and resuming the invocation request and marking the invoked context active.

7. The method of claim 6, wherein the method includes a kernel which records the precedence for event capture based on programmatic "seize" or "capture" requests, the method comprising the steps of:

creating a capture record for each capture request by a context;

determining whether the capture is with a "seize" request;

responsive to determining the existence of a "seize" request, traversing a list of "seizer" contexts and enqueing the capture request in front of any request by lower priority contexts;

responsive to determining the existence of a "capture" request, traversing a list of "captor" contexts and enqueing the capture request in front of any request by higher priority contexts.

8. The method of claim 7, wherein the kernel implements the precedence of event capture on the occurrence of the event, the method comprising the steps of:

locating a list of "capture" and "seizure" records for this event;

traversing the "seizer" list to find a first context capturing this event with a priority lower than a context raising the event;

responsive to not finding a context capturing the event with a priority lower than the context raising the event, traversing the "captor" list to find a first context capturing this event with a priority lower than the context raising the event; and responsive to finding a capturing context, removing the captor record from the list and incrementing a counter in the address space of the capturing context.

9. The method of claim 4, wherein concurrency is provided by a non stack based instruction set.

10. The method of claim 4, wherein concurrency is provided in a multiprocessor environment.

11. The method of claim 4, wherein concurrency is provided by a multistack environment.

12. The method of claim 2, wherein event captures are programmatically prioritized, the method comprising the steps of:

specifying the capture of an event by a context with programmer syntax that allows:

event precedence to be based on the priority level of the context capturing the event; and event precedence to be secondary to any lower priority context capturing the event.

13. The method of claim 2, wherein the signalling of events is embedded within the instructions set of a computer.

14. The method of claim 3, wherein preemption based on events is embedded within the instructions set of a computer.

15. The method of claim 1, wherein the step of permitting the invocation comprises the further substep of:

permitting invocation from a context to itself recursively.

16. The method of claim 15, wherein the step of permitting invocation from a context to itself recursively, comprises the further substep of:

permitting a recursive context call only on a routine that is explicitly declared to be recursive.

17. The method of claim 1, wherein the enforcement of hierarchy is embedded within the instructions set of a computer.

18. The method of claim 1, wherein the method is provided in a code library that is linked into an address space containing the contexts for at least one application, and wherein there is provided a code preprocessor for translating programming language extensions included in the contexts into procedural calls for invoking the method.

* * * * *